(12) United States Patent
Hashimoto

(10) Patent No.: US 12,292,911 B2
(45) Date of Patent: May 6, 2025

(54) CONTENT PROCESSING METHOD AND COMPUTER-READABLE MEDIUM

(71) Applicant: OTSUKA CHEMICAL CO., LTD., Osaka (JP)

(72) Inventor: Shigeharu Hashimoto, Osaka (JP)

(73) Assignee: OTSUKA CHEMICAL CO., LTD., Osaka (JP)

( * ) Notice: Subject to any disclaimer, the term of this patent is extended or adjusted under 35 U.S.C. 154(b) by 0 days.

(21) Appl. No.: 18/627,150

(22) Filed: Apr. 4, 2024

(65) Prior Publication Data

US 2024/0248923 A1 Jul. 25, 2024

Related U.S. Application Data

(63) Continuation of application No. PCT/JP2022/034210, filed on Sep. 13, 2022.

(30) Foreign Application Priority Data

Oct. 8, 2021 (JP) .................................. 2021-166514

(51) Int. Cl.
*G06F 16/00* (2019.01)
*G06F 16/338* (2019.01)

(52) U.S. Cl.
CPC .................. *G06F 16/338* (2019.01)

(58) Field of Classification Search
CPC .................................................. G06F 16/338
See application file for complete search history.

(56) References Cited

U.S. PATENT DOCUMENTS

2001/0047345 A1 11/2001 Kindo

FOREIGN PATENT DOCUMENTS

| CN | 110362833 A | * 10/2019 | ............ G06F 40/211 |
|---|---|---|---|
| JP | 2001-117937 A | 4/2001 | |

(Continued)

OTHER PUBLICATIONS

International Search Report; Application No. PCT/JP2022/034210; mail date Dec. 6, 2022; 2 pages (English translation).

*Primary Examiner* — Ajith Jacob
(74) *Attorney, Agent, or Firm* — Fitch, Even, Tabin & Flannery LLP

(57) ABSTRACT

Provided is a content processing method for determining a degree of priority of presentation of each of a plurality of contents, comprising: identifying the plurality of contents; receiving a first set including contents given positive evaluations from an operator and a second set including contents given negative evaluations from the operator from among the plurality of contents; extracting a first word set included in the first set and a second word set included in the second set; identifying a plurality of keywords including a plurality of positive keywords related to the first set and a plurality of negative keywords related to the second set according to a first evaluation criterion, the plurality of positive keywords being identified based on the first word set, the plurality of negative keywords being identified based on the second word set; giving weights to the plurality of keywords according to a second evaluation criterion so as to give a weight of zero or more to each of the plurality of positive keywords and give a weight of zero or less to each of the plurality of negative keywords; deriving a total for each of the plurality of contents by summing, over the plurality of keywords, a product of a frequency of appearance of each of the plurality of keywords and the given weight for the each of the plurality of keywords to obtain the total for each of the plurality of contents; and determining the degree of priority of presentation of each of the plurality of contents based on the total for the each of the plurality of contents.

16 Claims, 22 Drawing Sheets

(56) References Cited

FOREIGN PATENT DOCUMENTS

| | | | |
|---|---|---|---|
| JP | 2002-007744 | A | 1/2002 |
| JP | 3736564 | B2 | 1/2006 |
| JP | 5424393 | B2 | 2/2014 |
| JP | 2020-102021 | A | 7/2020 |

* cited by examiner

| No. | POSITIVE KEYWORD | SYNONYMS & VARIANT NOTATIONS | WEIGHT (r) |
|---|---|---|---|
| 1 | HEATER | | 5 |
| 2 | METAL | COPPER, IRON | 2 |
| 3 | CERAMIC | | 1 |
| 4 | | | |

| No. | NEGATIVE KEYWORD | SYNONYMS & VARIANT NOTATIONS | WEIGHT (r) |
|---|---|---|---|
| 1 | EXHAUST GAS | | -5 |
| 2 | HOLE | GAP | -3 |
| 3 | | | |
| 4 | | | |

| No. | m | Total(m) | BELONGING SET |
|---|---|---|---|
| 1 | 45 | 20124 | R1 |
| 2 | 3 | 18415 | R0 |
| 3 | 89 | 12441 | R0 |
| 4 | 59 | 10020 | R0 |
| 5 | 182 | 8920 | G0 |
| ... | ... | ... | ... |
| 199 | 42 | -6040 | G1 |
| 200 | 5 | -12001 | T0 |

| No. | m | Total(m) | BELONGING SET | i |
|---|---|---|---|---|
| 1 | 45 | 20124 | R1 | ■ |
| 2 | 56 | 20001 | R1 | ■ |
| 3 | 74 | 18410 | G1 | |
| 4 | 158 | 15441 | R1 | ■ |
| 5 | 140 | 8950 | G1 | |
| 6 | 5 | 5621 | R1 | ■ |
| 7 | 26 | 5552 | G1 | |
| 8 | 21 | 4201 | R1 | ■ |
| 9 | 167 | 500 | T1 | ▨ |
| 10 | 142 | 12 | G1 | |
| 11 | 112 | -41 | R1 | ■ |
| 12 | 103 | -56 | G1 | |
| 13 | 52 | -543 | G1 | |
| 14 | 42 | -1512 | T1 | ▨ |
| 15 | 22 | -2201 | T1 | ▨ |
| 16 | 86 | -2540 | G1 | |
| 17 | 66 | -2901 | G1 | |

| No. | m | Total(m) | BELONGING SET | i |
|---|---|---|---|---|
| 1 | 45 | 18200 | R1 | ■ |
| 2 | 56 | 17502 | R1 | ■ |
| 3 | 158 | 16410 | R1 | ■ |
| 4 | 74 | 15441 | G1 | |
| 5 | 21 | 8950 | R1 | ■ |
| 6 | 5 | 5621 | R1 | ■ |
| 7 | 112 | 5552 | R1 | ■ |
| 8 | 140 | 4201 | G1 | |
| 9 | 167 | 500 | T1 | ▨ |
| 10 | 142 | 12 | G1 | |
| 11 | 26 | -41 | R1 | ■ |
| 12 | 103 | -56 | G1 | |
| 13 | 52 | -543 | G1 | |
| 14 | 42 | -1512 | T1 | ▨ |
| 15 | 22 | -2201 | T1 | ▨ |
| 16 | 86 | -2540 | G1 | |
| 17 | 66 | -2901 | G1 | |

```
┌─────────────────────────────────────────────────┐
│ SELECT N_p WEIGHTING PATTERNS FROM AMONG X_p    │
│ WEIGHTING PATTERNS IN WHICH ONE OR ONES OF      │
│ FINITE NUMBER OF WEIGHTS ARE GIVEN TO           │
│ PLURALITY OF POSITIVE KEYWORDS                  │
└─────────────────────────────────────────────────┘
                          ↓  S1102
┌─────────────────────────────────────────────────┐
│ BY SEQUENTIALLY APPLYING X_p WEIGHTING PATTERNS,│
│ OBTAIN TOTAL A FOR EACH OF PLURALITY OF         │
│ CONTENTS INCLUDED IN FIRST SET BY SUMMING,      │
│ OVER PLURALITY OF POSITIVE KEYWORDS, PRODUCT OF │
│ FREQUENCY OF APPEARANCE OF EACH OF PLURALITY OF │
│ POSITIVE KEYWORDS AND GIVEN WEIGHT FOR THE EACH │
│ OF PLURALITY OF POSITIVE KEYWORDS, AND SUM      │
│ TOTALS A FOR PLURALITY OF CONTENTS INCLUDED IN  │
│ FIRST SET TO OBTAIN SUM SA, THEREBY OBTAIN X_p  │
│ SUMS SA CORRESPONDING RESPECTIVELY TO X_p       │
│ WEIGHTING PATTERNS                              │
└─────────────────────────────────────────────────┘
                          ↓  S1104
┌─────────────────────────────────────────────────┐
│ IDENTIFY N_p SUMS SA FROM AMONG X_p SUMS SA IN  │
│ DESCENDING ORDER TO SELECT N_p WEIGHTING        │
│ PATTERNS CORRESPONDING RESPECTIVELY TO          │
│ IDENTIFIED N_p SUMS SA                          │
└─────────────────────────────────────────────────┘
                          ↓
FIG.15A              ( RETURN )
```

```
┌─────────────────────────────────────────────────┐
│ SELECT N_n WEIGHTING PATTERNS FROM AMONG X_n    │
│ WEIGHTING PATTERNS IN WHICH ONE OR ONES OF      │
│ FINITE NUMBER OF WEIGHTS ARE GIVEN TO           │
│ PLURALITY OF NEGATIVE KEYWORDS                  │
└─────────────────────────────────────────────────┘
                          ↓  S1122
┌─────────────────────────────────────────────────┐
│ BY SEQUENTIALLY APPLYING X_n WEIGHTING PATTERNS,│
│ OBTAIN TOTAL D FOR EACH OF PLURALITY OF         │
│ CONTENTS INCLUDED IN SECOND SET BY SUMMING,     │
│ OVER PLURALITY OF NEGATIVE KEYWORDS, PRODUCT OF │
│ FREQUENCY OF APPEARANCE OF EACH OF PLURALITY OF │
│ NEGATIVE KEYWORDS AND GIVEN WEIGHT FOR THE EACH │
│ OF PLURALITY OF NEGATIVE KEYWORDS, AND SUM      │
│ TOTALS D FOR PLURALITY OF CONTENTS INCLUDED IN  │
│ SECOND SET TO OBTAIN SUM SD, THEREBY OBTAIN X_n │
│ SUMS SD CORRESPONDING RESPECTIVELY TO X_n       │
│ WEIGHTING PATTERNS                              │
└─────────────────────────────────────────────────┘
                          ↓  1124
┌─────────────────────────────────────────────────┐
│ IDENTIFY N_n SUMS SD FROM AMONG X_n SUMS SD IN  │
│ ASCENDING ORDER TO SELECT N_n WEIGHTING         │
│ PATTERNS CORRESPONDING RESPECTIVELY TO          │
│ IDENTIFIED N_n SUMS SD                          │
└─────────────────────────────────────────────────┘
                          ↓
FIG.15B              ( RETURN )
```

```
                ┌─────────────────────────────────────────────┐
                │  SELECT N_p WEIGHTING PATTERNS FROM AMONG X_p │
                │  WEIGHTING PATTERNS IN WHICH ONE OR ONES OF │
                │  FINITE NUMBER OF WEIGHTS ARE GIVEN TO      │
                │  PLURALITY OF POSITIVE KEYWORDS             │
                └─────────────────────────────────────────────┘
                                    │         S1202
                                    ▼
┌───────────────────────────────────────────────────────────────────┐
│ BY SEQUENTIALLY APPLYING X_p WEIGHTING PATTERNS, OBTAIN TOTAL A FOR│
│ EACH OF PLURALITY OF CONTENTS INCLUDED IN FIRST SET BY SUMMING, OVER│
│ PLURALITY OF POSITIVE KEYWORDS, PRODUCT OF FREQUENCY OF APPEARANCE │
│ OF EACH OF PLURALITY OF POSITIVE KEYWORDS AND GIVEN WEIGHT FOR THE │
│ EACH OF PLURALITY OF POSITIVE KEYWORDS, AND OBTAIN TOTAL A_pm WHICH IS│
│ SMALLEST VALUE AMONG TOTALS A FOR PLURALITY OF CONTENTS INCLUDED IN│
│ FIRST SET, THEREBY OBTAIN X_p TOTALS A_pm CORRESPONDING RESPECTIVELY TO│
│ X_p WEIGHTING PATTERNS                                            │
└───────────────────────────────────────────────────────────────────┘
                                    │         S1204
                                    ▼
┌───────────────────────────────────────────────────────────────────┐
│ IDENTIFY N_p TOTALS A_pm FROM AMONG X_p TOTALS A_pm IN            │
│ DESCENDING ORDER TO SELECT N_p WEIGHTING PATTERNS                 │
│ CORRESPONDING RESPECTIVELY TO IDENTIFIED N_p TOTALS A_pm          │
└───────────────────────────────────────────────────────────────────┘
                                    │
                                    ▼
              FIG.16A           ( RETURN )
```

```
                ┌─────────────────────────────────────────────┐
                │  SELECT N_n WEIGHTING PATTERNS FROM AMONG X_n │
                │  WEIGHTING PATTERNS IN WHICH ONE OR ONES OF │
                │  FINITE NUMBER OF WEIGHTS ARE GIVEN TO      │
                │  PLURALITY OF NEGATIVE KEYWORDS             │
                └─────────────────────────────────────────────┘
                                    │         S1212
                                    ▼
┌───────────────────────────────────────────────────────────────────┐
│ BY SEQUENTIALLY APPLYING X_n WEIGHTING PATTERNS, OBTAIN TOTAL A_n │
│ FOR EACH OF PLURALITY OF CONTENTS INCLUDED IN FIRST SET BY        │
│ SUMMING, OVER PLURALITY OF NEGATIVE KEYWORDS, PRODUCT OF          │
│ FREQUENCY OF APPEARANCE OF EACH OF PLURALITY OF NEGATIVE          │
│ KEYWORDS AND GIVEN WEIGHT FOR THE EACH OF PLURALITY OF NEGATIVE   │
│ KEYWORDS, AND OBTAIN TOTAL A_nm WHICH IS SMALLEST VALUE AMONG     │
│ TOTALS A_n FOR PLURALITY OF CONTENTS INCLUDED IN FIRST SET        │
└───────────────────────────────────────────────────────────────────┘
                                    │         S1214
                                    ▼
┌───────────────────────────────────────────────────────────────────┐
│ IDENTIFY N_n TOTALS A_nm FROM AMONG X_n TOTALS A_nm IN            │
│ DESCENDING ORDER TO SELECT N_n WEIGHTING PATTERNS                 │
│ CORRESPONDING RESPECTIVELY TO IDENTIFIED N_n TOTALS A_nm          │
└───────────────────────────────────────────────────────────────────┘
                                    │
                                    ▼
              FIG.16B           ( RETURN )
```

1600

| VARIA-TION | SECOND EVALUATION CRITERION |
|---|---|
| 1 | A criterion being a weighting pattern with which a sum $SA_3$ obtained by summing totals $A_3$ for the plurality of contents included in the first set is a largest value or a value close to the largest value, the totals $A_3$ each being obtained for one of the plurality of contents included in the first set by summing, over the plurality of keywords, a product of a frequency of appearance of each of the plurality of keywords and a possible value of the corresponding weight. |
| 2 | A criterion being a weighting pattern with which a total $A_{3m}$ being a smallest value among totals $A_3$ is a largest value or a value close to the largest value, the totals $A_3$ each being obtained for one of the plurality of contents included in the first set by summing, over the plurality of keywords, a product of a frequency of appearance of each of the plurality of keywords and a possible value of the corresponding weight. |
| 3 | A criterion being a weighting pattern with which, when totals $A_4$ for the plurality of contents included in the first set and the second set are arranged in descending order, a position of the lowest total $A_4$ among the totals $A_4$ for the plurality of contents included in the first set is a highest position or a position close to the highest position, the totals $A_4$ each being obtained for one of the plurality of contents included in the first set and the second set by summing, over the plurality of keywords, a product of a frequency of appearance of each of the plurality of keywords and a possible value of the corresponding weight. |
| 4-1 | A criterion being a weighting pattern with which a value of P/Q calculated by using a position P and a number Q is a largest value or a value larger than a predetermined value,<br>where when totals $A_4$ for the plurality of contents included in the first set and the second set are arranged in descending order, the position P is a position of the lowest total $A_4$ among the totals $A_4$ for the plurality of contents included in the first set, the totals $A_4$ each being obtained for one of the plurality of contents included in the first set and the second set by summing, over the plurality of keywords, a product of a frequency of appearance of each of the plurality of keywords and a possible value of the corresponding weight, and<br>the number Q is such a number of the plurality of contents included in the first set and the second set that a sum $SA_4$ obtained by summing the totals $A_4$ for the plurality of contents included in the first set is larger than a predetermined threshold. |
| 4-2 | (In addition to Variation 4-1)<br>A criterion being a weighting pattern with which the number Q is a smallest value or a value close to the smallest value. |

FIG.20

CONTENT PROCESSING METHOD AND COMPUTER-READABLE MEDIUM

CROSS-REFERENCE TO RELATED APPLICATIONS

This application is a continuation of International Application Serial No. PCT/JP2022/034210, filed Sep. 13, 2022, which claims priority to Japanese Patent Application No. 2021-166514, filed Oct. 8, 2021. The contents of these applications are incorporated herein by reference in their entirety.

BACKGROUND

Technical Field

The present disclosure relates to a content processing method and a non-transitory computer-readable medium storing a content processing program.

Background Art

Companies, research institutes, and so on need technology to efficiently search for contents including technical documents in order to promote research and development and pursue intellectual property strategies and marketing strategies for their products and services. For prevention of patent infringement, acquisition of rights, understanding of other companies' technologies, and so on, it has become important to efficiently obtain information without search omissions, especially in patent document searches.

The following are conventional technologies.

For example, there is a technology (see Japanese Patent No. 5424393, for example) in which each of a plurality of documents to be evaluated including a plurality of words is evaluated by a user regarding whether it is a positively evaluated document related to the target theme or a negatively evaluated document not related to the target theme; words are extracted from each evaluation target document, and also positive words appearing only in the positively evaluated documents, negative words appearing only in the negatively evaluated documents, and words categorized as common words appearing in both the positively evaluated documents and the negatively evaluated documents are extracted; and the degree of thematic relevance of each common word to the target theme based on the frequency of appearance of the word and its adjacency to other words.

Also, there is a technology (see Japanese Patent No. 3736564, for example) that involves: inputting unread information and pairing informational data and a training signal indicating whether one or more pieces of information consisting of one or more keywords are necessary with each other to prepare training data in advance; and based on one or more keywords attached to newly input unread information and the paired keywords and training signals, deriving a necessity signal for predicting the necessity of the unread information for the user which has a large value when the number of paired training signals indicating necessity for the keywords attached to the unread information is large and which has a small value when the number of paired training signals indicating unnecessity is small.

SUMMARY

An object of the technique of the present disclosure is to reduce operator's work by assisting the operator to more efficiently understand each of contents included in a set of contents that are obtained by performing a search of contents containing text or the like when the operator is provided with the set of contents.

The technique of the present disclosure provides a content processing method for determining a degree of priority of presentation of each of a plurality of contents, comprising: identifying the plurality of contents; receiving a first set including contents given positive evaluations from an operator and a second set including contents given negative evaluations from the operator from among the plurality of contents; extracting a first word set included in the first set and a second word set included in the second set; identifying a plurality of keywords including a plurality of positive keywords related to the first set and a plurality of negative keywords related to the second set according to a first evaluation criterion, the plurality of positive keywords being identified based on the first word set, the plurality of negative keywords being identified based on the second word set; giving weights to the plurality of keywords according to a second evaluation criterion so as to give a weight of zero or more to each of the plurality of positive keywords and give a weight of zero or less to each of the plurality of negative keywords; deriving a total for each of the plurality of contents by summing, over the plurality of keywords, a product of a frequency of appearance of each of the plurality of keywords and the given weight for the each of the plurality of keywords to obtain the total for each of the plurality of contents; and determining the degree of priority of presentation of each of the plurality of contents based on the total for the each of the plurality of contents.

The first evaluation criterion in the technique of the present disclosure may include a criterion of employing designation of a keyword from the operator.

Note that keywords and corresponding weights may be received from the operator as necessary.

The first evaluation criterion in the technique of the present disclosure may include a criterion of determining the plurality of keywords based on a frequency of appearance of each of words included in the first word set and the second word set per content in the first set and the second set.

The first evaluation criterion in the technique of the present disclosure may include a criterion of designating keywords whose frequencies of appearance in the first set are higher than frequencies of appearance thereof in the second set as the plurality of positive keywords, and designating keywords whose frequencies of appearance in the second set are higher than frequencies of appearance thereof in the first set as the plurality of negative keywords.

The giving weights in the technique of the present disclosure may include: preparing a finite number of candidate weights to give one of the finite number of candidate weights to each of the plurality of keywords; creating a plurality of weighting patterns in which one of the finite number of weights is given to each of the plurality of keywords by giving one of the finite number of weights to each of the plurality of keywords; and selecting one weighting pattern from among the plurality of weighting patterns according to the second evaluation criterion.

The creating a plurality of weighting pattern in the technique of the present disclosure may include: selecting $N_p$ weighting patterns from among $X_p$ weighting patterns in which one or ones of the finite number of weights are given to the plurality of positive keywords; selecting $N_n$ weighting patterns from among $X_n$ weighting patterns in which one or ones of the finite number of weights are given to the plurality of negative keywords; and creating $N_p \times N_n$ weighting patterns as the plurality of weighting patterns by comprehensively pairing the $N_p$ weighting patterns and the $N_n$ weighting patterns with one another.

The selecting $N_p$ weighting patterns in the technique of the present disclosure may include: by sequentially applying the $X_p$ weighting patterns, obtaining a total A for each of the plurality of contents included in the first set by summing, over the plurality of positive keywords, a product of a frequency of appearance of each of the plurality of positive keywords and the given weight for the each of the plurality of positive keywords, and summing the totals A for the plurality of contents included in the first set to obtain a sum SA, thereby obtaining $X_p$ sums SA corresponding respectively to the $X_p$ weighting patterns; and identifying $N_p$ sums SA from among the $X_p$ sums SA in descending order to select $N_p$ weighting patterns corresponding respectively to the identified $N_p$ sums SA.

The selecting $N_n$ weighting patterns in the technique of the present disclosure may include: by sequentially applying the $X_n$ weighting patterns, obtaining a total D for each of the plurality of contents included in the second set by summing, over the plurality of negative keywords, a product of a frequency of appearance of each of the plurality of negative keywords and the given weight for the each of the plurality of negative keywords, and summing the totals D for the plurality of contents included in the second set to obtain a sum SD, thereby obtaining $X_n$ sums SD corresponding respectively to the $X_n$ weighting patterns; and identifying $N_n$ sums SD from among the $X_n$ sums SD in ascending order to select $N_n$ weighting patterns corresponding respectively to the identified $N_n$ sums SD.

The selecting $N_p$ weighting patterns in the technique of the present disclosure may include: by sequentially applying the $X_p$ weighting patterns, obtaining a total A for each of the plurality of contents included in the first set by summing, over the plurality of positive keywords, a product of a frequency of appearance of each of the plurality of positive keywords and the given weight for the each of the plurality of positive keywords, and obtaining a total $A_{pm}$ which is a smallest value among the totals A for the plurality of contents included in the first set, thereby obtaining $X_p$ totals $A_{pm}$ corresponding respectively to the $X_p$ weighting patterns; and identifying $N_p$ totals $A_{pm}$ from among the $X_p$ totals $A_{pm}$ in descending order to select $N_p$ weighting patterns corresponding respectively to the identified $N_p$ totals $A_{pm}$.

The selecting $N_n$ weighting patterns in the technique of the present disclosure may include: by sequentially applying the $X_n$ weighting patterns, obtaining a total $A_n$ for each of the plurality of contents included in the first set by summing, over the plurality of negative keywords, a product of a frequency of appearance of each of the plurality of negative keywords and the given weight for the each of the plurality of negative keywords, and obtaining a total $A_{nm}$ which is a smallest value among the totals $A_n$ for the plurality of contents included in the first set; and identifying $N_n$ totals $A_{nm}$ from among the $X_n$ totals $A_{nm}$ in descending order to select $N_n$ weighting patterns corresponding respectively to the identified $N_n$ totals $A_{nm}$.

The selecting $N_p$ weighting patterns in the technique of the present disclosure may include: by sequentially applying the $X_p$ weighting patterns, obtaining a total $A_1$ for each of the plurality of contents included in the first set by summing, over the plurality of positive keywords, a product of a frequency of appearance of each of the plurality of positive keywords and the given weight for the each of the plurality of positive keywords, and summing the totals $A_1$ for the plurality of contents included in the first set to obtain a sum $SA_1$, thereby obtaining $X_p$ sums $SA_1$ corresponding respectively to the $X_p$ weighting patterns; by sequentially applying the $X_p$ weighting patterns, obtaining a total $D_1$ for each of the plurality of contents included in the second set by summing, over the plurality of positive keywords, a product of a frequency of appearance of each of the plurality of positive keywords and the given weight for the each of the plurality of positive keywords, and summing the totals $D_1$ for the plurality of contents included in the second set to obtain a sum $SD_1$, thereby obtaining $X_p$ sums $SD_1$ corresponding respectively to the $X_p$ weighting patterns; and identifying $N_p$ calculation values $H_1$ (=$SA_1/SD_1$ or $SA_1-SD_1$) from among the calculation values $H_1$ corresponding respectively to the $X_p$ weighting patterns in descending order to select $N_p$ weighting patterns corresponding respectively to the $N_p$ calculation values $H_1$.

The selecting $N_n$ weighting patterns in the technique of the present disclosure may include: by sequentially applying the $X_n$ weighting patterns, obtaining a total $A_2$ for each of the plurality of contents included in the first set by summing, over the plurality of negative keywords, a product of a frequency of appearance of each of the plurality of negative keywords and the given weight for the each of the plurality of negative keywords, and summing the totals $A_2$ for the plurality of contents included in the first set to obtain a sum $SA_2$, thereby obtaining $X_n$ sums $SA_2$ corresponding respectively to the $X_n$ weighting patterns; by sequentially applying the $X_n$ weighting patterns, obtaining a total $D_2$ for each of the plurality of contents included in the second set by summing, over the plurality of negative keywords, a product of a frequency of appearance of each of the plurality of negative keywords and the given weight for the each of the plurality of negative keywords, and summing the totals $D_2$ for the plurality of contents included in the second set to obtain a sum $SD_2$, thereby obtaining $X_n$ sums $SD_2$ corresponding respectively to the $X_n$ weighting patterns; and identifying $N_n$ calculation values $H_2$ (=$SA_2/SD_2$ or $SD_2-SA_2$) from among the calculation values $H_2$ corresponding respectively to the $X_n$ weighting patterns in ascending order to select $N_n$ weighting patterns corresponding respectively to the $N_n$ calculation values $H_2$.

The giving weights in the technique of the present disclosure may include solving an optimization problem that derives the weight for each of the plurality of keywords with the second evaluation criterion as an objective function to thereby determine a weighting pattern specifying weighting to be applied to each of the plurality of keywords.

The second evaluation criterion in the technique of the present disclosure may include a criterion of a weighting pattern with which a sum $SA_3$ obtained by summing totals $A_3$ for the plurality of contents included in the first set is a largest value or a value close to the largest value, the totals $A_3$ each being obtained for one of the plurality of contents included in the first set by summing, over the plurality of keywords, a product of a frequency of appearance of each of the plurality of keywords and a possible value of the corresponding weight.

The second evaluation criterion in the technique of the present disclosure may include a criterion of a weighting pattern with which a total $A_3m$ being a smallest value among totals $A_3$ is a largest value or a value close to the largest value, the totals $A_3$ each being obtained for one of the plurality of contents included in the first set by summing, over the plurality of keywords, a product of a frequency of appearance of each of the plurality of keywords and a possible value of the corresponding weight.

The second evaluation criterion in the technique of the present disclosure may include a criterion of a weighting pattern with which, when totals $A_4$ for the plurality of contents included in the first set and the second set are arranged in descending order, a position of the lowest total $A_4$ among the totals $A_4$ for the plurality of contents included in the first set is a highest position or a position close to the highest position, the totals $A_4$ each being obtained for one of the plurality of contents included in the first set and the second set by summing, over the plurality of keywords, a product of a frequency of appearance of each of the plurality of keywords and a possible value of the corresponding weight.

The second evaluation criterion in the technique of the present disclosure may include a criterion of a weighting pattern with which a value of P/Q calculated by using a position P and a number Q is a largest value or a value larger than a predetermined value, where when totals $A_4$ for the plurality of contents included in the first set and the second set are arranged in descending order, the position P is a position of the lowest total $A_4$ among the totals $A_4$ for the plurality of contents included in the first set, the totals $A_4$ each being obtained for one of the plurality of contents included in the first set and the second set by summing, over the plurality of keywords, a product of a frequency of appearance of each of the plurality of keywords and a possible value of the corresponding weight, and the number Q is such a number of the plurality of contents included in the first set and the second set that a sum $SA_4$ obtained by summing the totals $A_4$ for the plurality of contents included in the first set is larger than a predetermined threshold.

The second evaluation criterion in the technique of the present disclosure may further include a criterion of a weighting pattern with which the number Q is a smallest value or a value close to the smallest value.

The technique of the present disclosure may be a program that causes a computer to execute the above method.

With the technique of the present disclosure, it is possible to reduce operator's work by assisting the operator to more efficiently understand each of contents included in a set of contents that are obtained by performing a search of contents containing text or the like when the operator is provided with the set of contents.

BRIEF DESCRIPTION OF DRAWINGS

FIGS. 1A and 1B illustrate various sets of contents obtained by a search or the like.

FIG. 15A is a flowchart illustrating details of the process of step S1052 of selecting $N_p$ weighting patterns from among $X_p$ weighting patterns in which one or ones of the finite number of weights are given to the plurality of positive keywords. FIG. 15B is a flowchart illustrating details of the process of step S1054 of selecting $N_n$ weighting patterns from among $X_n$ weighting patterns in which one or ones of the finite number of weights is given to the plurality of negative keywords.

FIG. 16A is a flowchart illustrating details of the process of step S1052 of selecting $N_p$ weighting patterns from among $X_p$ weighting patterns in which one or ones of the finite number of weights are given to the plurality of positive keywords. FIG. 16B is a flowchart illustrating details of the process of step S1054 of selecting $N_n$ weighting patterns from among $X_n$ weighting patterns in which one or ones of the finite number of weights is given to the plurality of negative keywords.

FIG. 20 is a table illustrating examples of the second evaluation criterion.

DETAILED DESCRIPTION

Figure 1A:
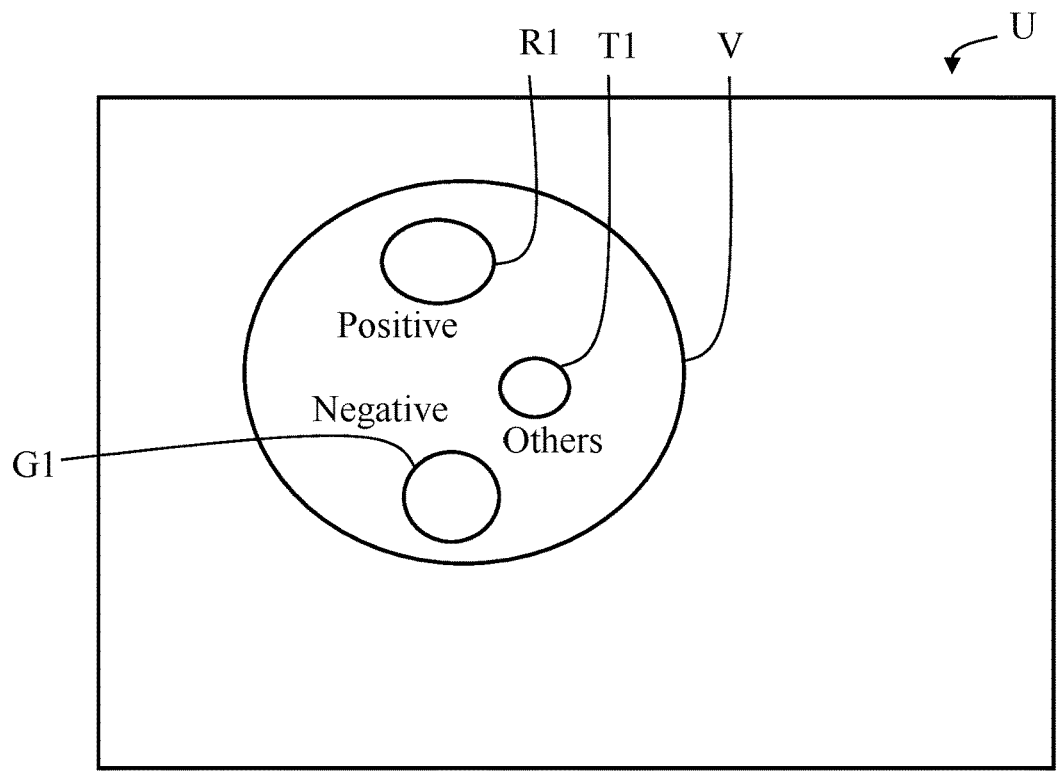

In particular, in patent document research, it is necessary to devise a search formula so as to prevent omission of relevant patent documents and inclusion of many unnecessary patent documents (noise documents). Thus, a search formula is considered, and a set of patent documents are obtained with it. However, a set of patent documents obtained with a search formula thus devised include many documents irrelevant to the research target (noise documents).

To reduce these noise documents, more strict search filtering must be applied. However, applying more strict search filtering involves a risk of omitting important documents in the search result. Conversely, performing a search in a way to prevent omission of important documents will increase the size of the set of documents in the search result, which will in turn increase the operator's work for browsing (reviewing) the documents.

For example, in the case of extracting related patents by reviewing them, it is a common practice to focus on whether words related to the target technical field are included. A document tends to be determined as a noise document if, for example, words not related to the research target are included.

Thus, an appropriate search result tends to be obtained by performing a search with a search formula created by appropriately selecting words and phrases related to the research target and words and phrases not related to the research target.

Here, it is to be noted that patent documents, which include long sentences, may include descriptions of matters other than the patent documents' target technologies in some sentences. For example, there are many cases where unsuccessful test examples and the like (counter examples) are described. Also, there are cases where words that describe the level of technical performance, such as "high" and "low", are used. In the case of using words and phrases that characterize performance as search words and phrases, a document can be a noise document if a word indicating the level of that performance is not suitable for the technology of interest or in other similar cases.

Note that a search formula can include a NOT operation. It has been a conventional practice to designate non-related words and phrases and incorporating a NOT operation in a search formula to obtain a search result excluding documents including the non-related words and phrases. This method, however, has a risk of omitting an important document in a search result against the searcher's intention if the document includes a counter example as mentioned above or the like.

To address this, the technology of the disclosure proposes, for example, using weights for keywords related to a research target which the operator desires and for keywords not related to the research target to give a degree of priority to each content included in a set of contents. By adjusting the order of presentation of the contents to the operator based on the degrees of priority or displaying the contents and the degrees of priority in association with each another, the operator to more easily utilize the contents.

Note that the keywords used in the following embodiments are keywords that can be set separately from the keywords used in the search formula, and do not necessarily have to be the same keywords. The set of contents to be handled in the following embodiments may be one obtained by a search using a search formula with keywords, or a set of contents collected by using other means, e.g., AI, or the like. In short, the following embodiments are not dependent on the means for collecting the target set of contents.

In the embodiments of the disclosure, a content means an expression including verbally expressed matter such as text, an image, a video, and speech.

The operator, who designs search formulas, has a certain level of knowledge and understanding of technical terms. Thus, the operator can designate keywords that are closely associated with contents determined to be important to the operator themself. Moreover, the operator can designate keywords that are closely related to contents determined to be not important to the operator themself (noise documents). Furthermore, it is considered possible for the operator to designate synonyms and quasi-synonyms of each keyword.

Incidentally, if the operator is an individual with a technical level high enough to create search formulas, the operator is likely to be able to select (or designate) related keywords and non-related keywords without reviewing the contents. In addition, if the operator has reviewed some of the contents in a search result, the operator should be able to more appropriately select (or designate) keywords related to the target contents and keywords not related to the target contents.

Moreover, a list of words and phrases included the set of contents in a search result (a set of contents that have been reviewed) may be presented to the operator in an easy-to-understand fashion by means of text mining, statistical processing, or the like. In this way, the operator can easily select related keywords and non-related keywords. In this case, the operator cannot predict what kinds of keywords are included in the target contents. This can also occur when many words and phrases that are synonyms, quasi-synonyms, and/or variant notations of the keywords which the operator used in the search formula or the like are included in the target contents. Thus, it is possible to improve the accuracy of this method with a method that involves selecting keywords from a list of words and phrases included in targets.

In the present specification, a keyword closely related to a content determined to be important for the operator themself (positive content) (search target document) will be referred to as "positive keyword". Moreover, a keyword closely related to a content determined to be not important for the operator themself (negative content) (noise document) will be referred to as "negative keyword".

<Description of Set as Search Result>

Figure 1B:
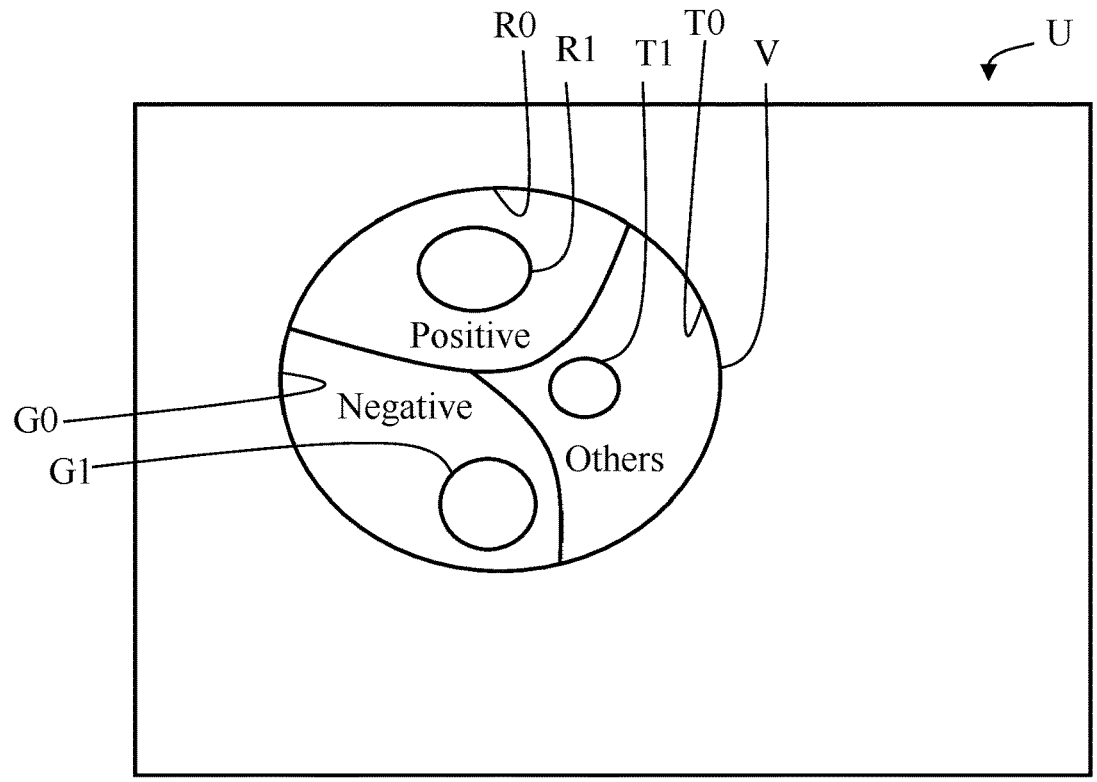

FIGS. 1A and 1B illustrate various sets of contents obtained by a search.

As illustrated in FIG. 1A, a set V is obtained as a result of filtering a content population U by using a search formula or the like. Generally, the operator reviews the contents included in the set V one by one, which were obtained by the filtering with a search or the like, to determine whether each of the contents is important.

A positive set R1 in FIG. 1A represents a set including contents determined to be important among the contents in the set V reviewed by the operator. The positive set R1 is defined as a positive set including contents given positive evaluations as the result of the review by the operator (positive contents).

A negative set G1 represents a set including contents determined to be not important among the contents in the set V reviewed by the operator. The negative set G1 is defined as a negative set including contents given negative evaluations as the result of the review by the operator (negative contents).

Another set T1 represents a set of contents that are neither important nor unimportant (or contents that has not been thoroughly reviewed and has not been given a thorough evaluation result) among the contents in the set V reviewed by the operator. The other set T1 is defined as another set including contents given neither a positive evaluation nor a negative evaluation as the result of the review by the operator.

Generally, the operator reviews the contents included in the set V one by one, which were obtained by the filtering and, by reviewing all the contents in the set V, gives a positive evaluation, a negative evaluation, another evaluation, or the like to each content. Note that the perspective of evaluation can vary depending on the purpose of the research to be conducted by the operator. There are various purposes of research such as acquiring a patent, obtaining documents for invalidating another company's patent, preventing infringements, figuring out other companies' technologies, and obtaining basic information for research and development. Needless to say, the perspective for determining the importance (priority) of one content will vary depending on which of these purposes of research is used.

FIG. 1B illustrates an example of a state after the operator has finished reviewing all of the contents in the set V, which is the search result. Specifically, the set V includes a positive set R0, a negative set G0, and another set T0.

To obtain each set illustrated in FIG. 1B, it is generally desirable that the operator review all of the contents in the set V.

Embodiment 1

In the embodiment to be presented below, a higher degree of priority is given to contents presumed to be more important to the operator. This makes it possible to infer at least the positive set R0 in advance.

By employing the present embodiment, the operator can refer to the degree of priority given to each content and preferentially browse (review) contents that are likely to be important to the operator first. By sequentially going through the contents with high degrees of priority, the operator can easily and appropriately process the contents belonging to the set V in a shorter time.

Figures 2A, 2B:
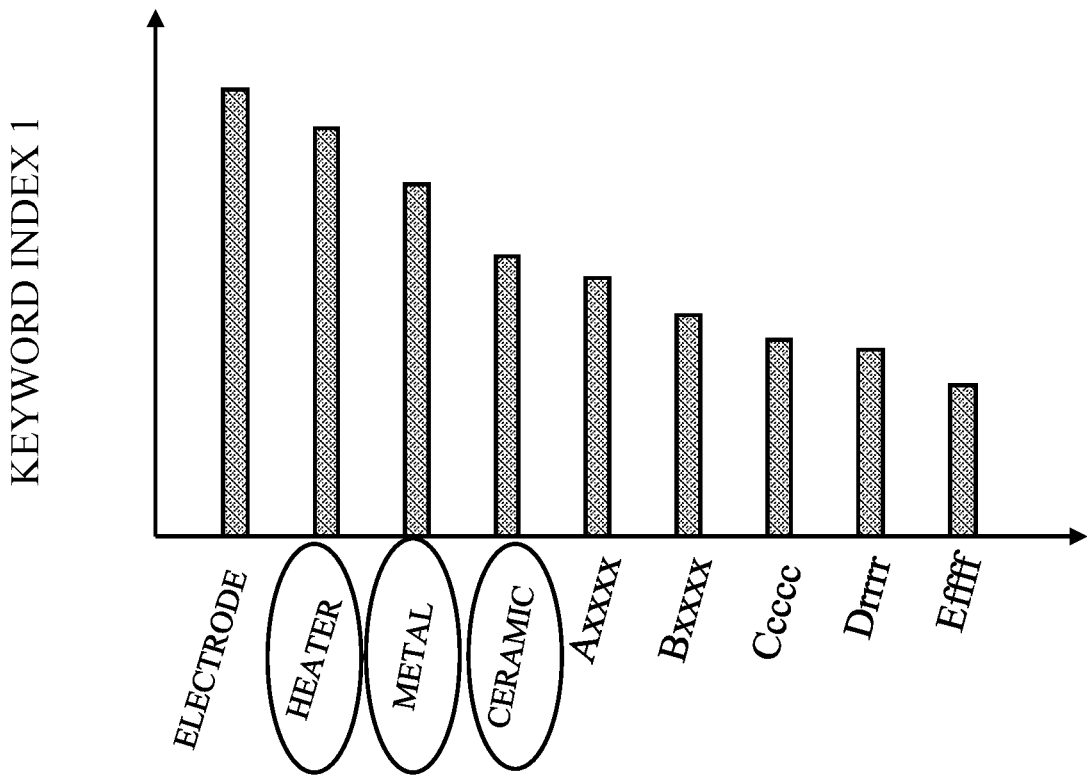
FIG. 2A is an example of information that can serve as a base for selecting positive keywords.
FIG. 2B illustrates a table in which positive keywords and corresponding weights (r) are designated by an operator.

FIG. 2A is an example of information that can serve as a base for selecting positive keywords.

In FIG. 2A, keywords are listed on the horizontal axis, and "Keyword Index 1" is plotted on the vertical axis for each keyword.

Referring to the graph of FIG. 2A, the operator can select at least one positive keyword. The following are examples of "Keyword Index 1" in FIG. 2A.

Examples of the Keyword Index 1
1. The frequency of appearance of the word included in some or all of the contents in the set V being a search result.
2. The average frequency of appearance of the word per content given a positive evaluation as a result of the review.
3. [The average frequency of appearance of the word per content given a positive evaluation as a result of the review]−[The average frequency of appearance of the word per content given a negative evaluation as a result of the review]

Note that "frequency of appearance" in the above may be the frequency of appearance of the word in part of the content(s) instead of the frequency of appearance of the word in the entirety of the content(s). For example, when a patent document is included as a content, the frequency of appearance of the word strictly in the claims of the patent document may be counted.

FIG. 2B illustrates a table in which positive keywords and corresponding weights (r) are designated by the operator.

The weight (r) for each keyword is desirably set such that the more likely the keyword is to be included in a content important (i.e., positive) to the operator, the larger a value greater than zero is given. Moreover, the weight (r) is desirably set such that the more likely the keyword is to be included in a content not important (i.e., negative) to the operator, the larger a value less than zero as an absolute value is given. Usage of the weight (r) will be described later.

Incidentally, there are a case where the operator has not reviewed the contents, and other similar cases. If so, the graph of FIG. 2A itself will not be present or another similarly situation will occur. Thus, the operator may freely designate positive keywords and the corresponding weights (r) based on the operator knowledge and the like without referring to the graph of FIG. 2A (or regardless of whether the graph of FIG. 2A is present or absent). Alternatively, a list of words included in some or all of the contents belonging to the set V may be presented to the operator, and the operator may select positive keywords from that list. It is desirable to designate at least one positive keyword. Note that setting the weight (r) to zero means the same as not designating the corresponding positive keyword.

Incidentally, a computer may automatically designate "synonyms and variant notations" by referring to dictionaries. Alternatively, a computer may refer to dictionaries and present candidate "synonyms and variant notations" to the operator to prompt the operator to select some. Alternatively, the operator may set "synonyms and variant notations". The words designated as "synonyms and variant notations" are desirably handled similarly to (as the same words as) the corresponding positive keywords.

Figures 3A, 3B:
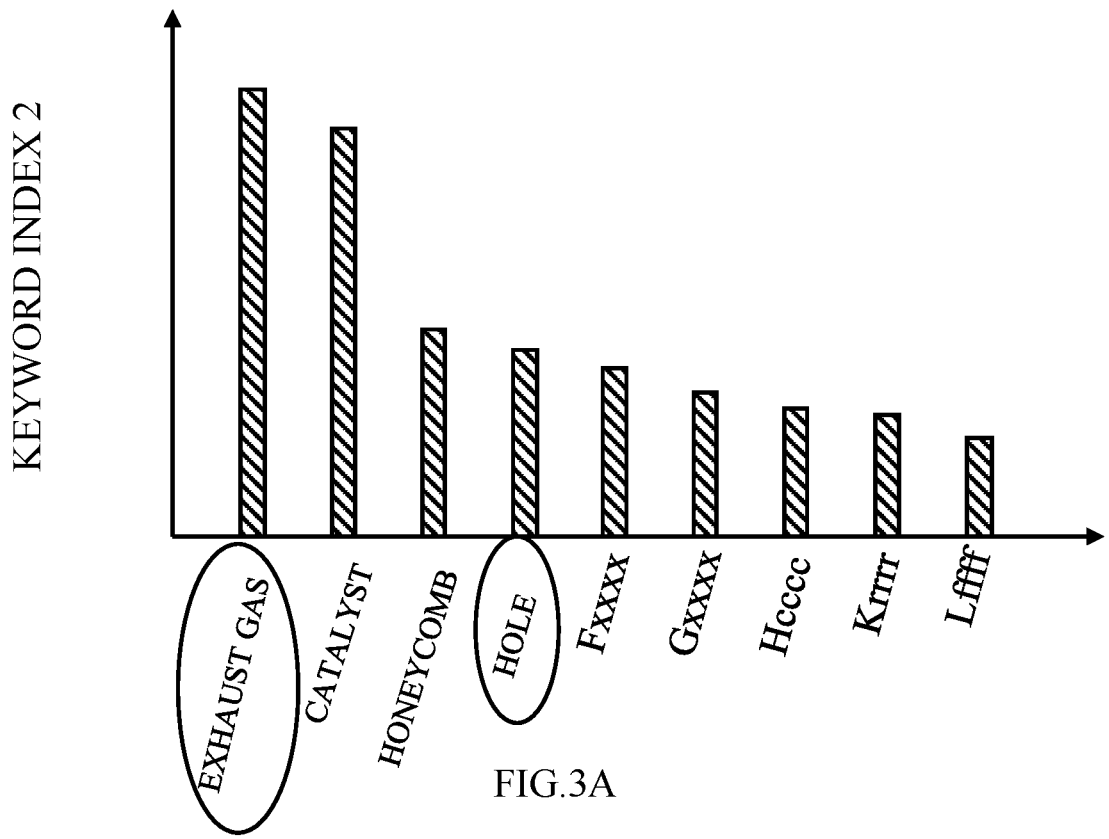
FIG. 3A is an example of a graph that can serve as a base for selecting negative keywords.
FIG. 3B illustrates a table in which negative keywords and corresponding weights (r) are designated by the operator.

FIG. 3A is an example of a graph that can serve as a base for selecting negative keywords.

In FIG. 3A, "Keyword Index 2" is plotted on the vertical axis for each word.

Referring to the graph of FIG. 3A, the operator can select at least one negative keyword. The following are examples of "Keyword Index 2" in FIG. 3A.

Examples of the Keyword Index 2
4. The frequency of appearance of the word included in some or all of the contents in the set V being a search result.
5. The average frequency of appearance of the word per content given a negative evaluation as a result of the review.
6. [The average frequency of appearance of the word per content given a negative evaluation as a result of the review]–[The average frequency of appearance of the word per content given a positive evaluation as a result of the review]

FIG. 3B illustrates a table in which negative keywords and corresponding weights (r) are designated by the operator.

Each weight (r) is desirably set such that the more likely the content is not important (i.e., negative) to the operator, the larger the absolute value of a negative value is given. Usage of the weight (r) will be described later.

Incidentally, there are a case where the operator has not reviewed the contents, and other similar cases. If so, the graph of FIG. 3A itself will not be present or another similarly situation will occur. Thus, the operator may freely designate negative keywords and the corresponding weights (r) based on the operator knowledge and the like without referring to the graph of FIG. 3A (or regardless of whether the graph of FIG. 3A is present or absent). Alternatively, a list of words included in some or all of the contents belonging to the set V may be presented to the operator, and the operator may select negative keywords from that list. It is desirable to designate at least one negative keyword. Note that setting the weight (r) to zero means the same as not designating the corresponding negative keyword.

Incidentally, a computer may automatically designate "synonyms and variant notations" by referring to dictionaries. Alternatively, a computer may refer to dictionaries and present candidate "synonyms and variant notations" to the operator to prompt the operator to select some. Alternatively, the operator may set "synonyms and variant notations". The words designated as "synonyms and variant notations" are desirably handled similarly to (as the same words as) the corresponding negative keywords.

Note that the positive evaluations and the negative evaluations mentioned above are an example of evaluation values.

Figures 4A, 4B:
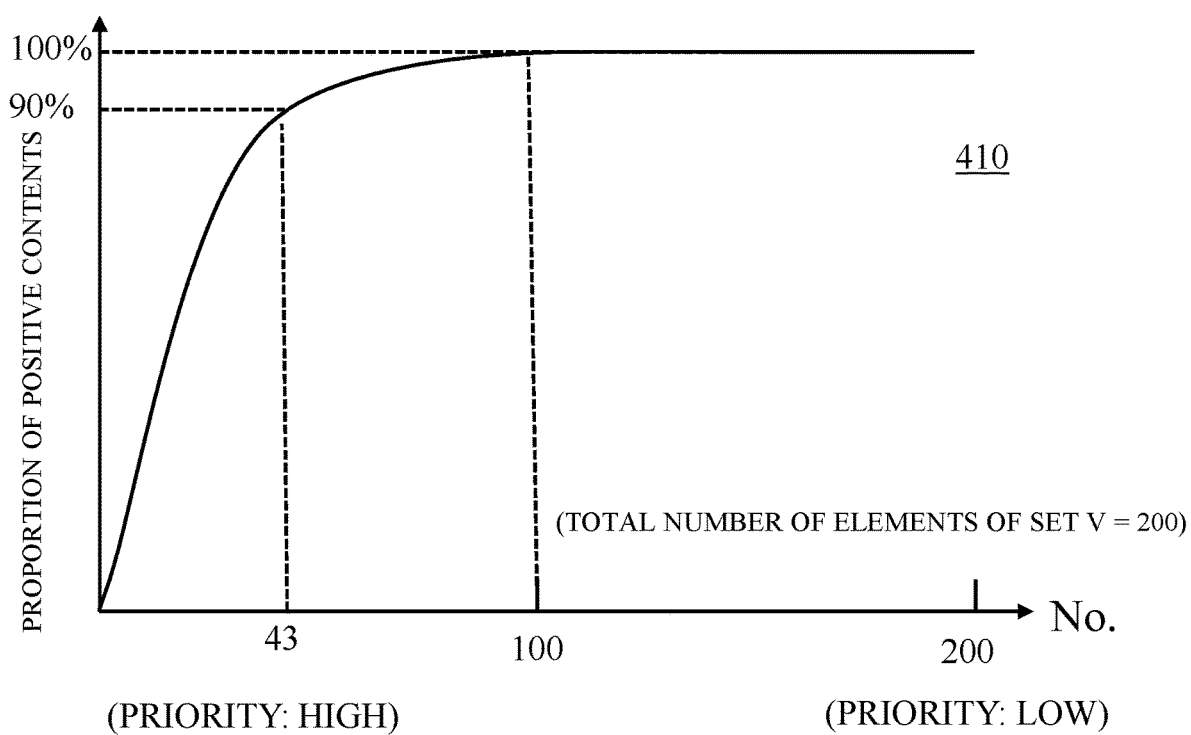
FIG. 4A is a table in which the totals of the products of the frequencies of appearance of keywords in contents included in a set V and respective weights for those keywords are listed in descending order.
FIG. 4B illustrates the result of reviewing all the contents included in the set V.

FIG. 4A is a table in which totals (Total(m)) for the contents included in the set V being a search result are listed in descending order.

For example, Total(m), or a total derived by summing the products of the frequencies of appearance of all keywords in a content m belonging to the set V being a search result and the respective weights for those keywords, is defined as below.

[Math. 1]

$$\text{Total}(m) = \sum_{n=1}^{u} c(m)_n r_n \quad (1)$$

where
- m: a number identifying a content included in the set V being a search result (one of consecutive integers starting from 1),
- u: the number of positive keywords+the number of negative keywords, i.e., the total number of keywords,
- $c(m)_n$: the frequency of appearance of the n-th positive keyword or negative keyword (keyword) in the content m, and
- $r_n$: the weight r for the n-th keyword.

The total described above, i.e., the total Total(m) of the products of the frequencies of appearance of the keywords in the content m included in the set V being a search result and the respective weights for those keywords, is an example of the degree of priority of the content m.

The weight for each positive keyword is desirably a numerical value more than or equal to zero, and the weight for each negative keyword is desirably a numerical value less than or equal to zero.

It is possible to infer that a content is likely to be more closely related to a technology which the operator desires the larger the frequency of appearance of a positive keyword in the content. In addition, the content including that positive keyword is likely to be a content more relevant to the technology which the operator desires the larger the weight for that positive keyword.

It is possible to infer that a content is likely to be less closely related to a technology which the operator desires the larger the frequency of appearance of a negative keyword in the content. In addition, the content including that negative keyword is likely to be a content less relevant to the technology which the operator desires the larger the absolute value of the weight for that negative keyword (a value less than or equal to zero).

Thus, the product of the frequency of appearance of a keyword (a positive keyword or a negative keyword) in a content and the weight for that keyword is an element of an index indicating the degree of importance of that content to the operator. Moreover, a total derived by summing the products for all keywords included in a content (positive keywords or negative keywords) can serve as an index indicating the degree of closeness of that content to the technology which the operator desires (degree of priority).

Thus, it is possible to infer that the larger the value of the total for a content (degree of priority) is, the closer the content is to the technology which the operator desires.

FIG. 4A is a table in which the totals of the products of the frequencies of appearance of the keywords in the contents included in the set V and the respective weights for those keywords are listed in descending order.

It is possible to infer that a content in a table 400 of FIG. 4A at a higher position is a content with a higher degree of priority. Conversely, it is possible to infer that a content in the table at a lower position is a content with a lower degree of priority.

For example, the content with content number 45 listed at the top of the table 400 of FIG. 4A is the content whose value of the total Total(m) is the largest. It means that the sum of the products of the frequencies of appearance of the keywords (positive keywords and negative keywords) in this content and the corresponding weights is the largest. In the table 400 of FIG. 4A, a content listed at a higher position is determined to be a content that is likely to include positive keywords with larger weights and thus have a higher degree of priority.

FIG. 4B illustrates the result of reviewing all the contents included in the set V. It is a graph in which the horizontal axis indicates degrees of priority in order, and the vertical axis indicates the ratio of contents determined to be important that are included among m contents from the one whose order of priority (No.) is 1 (No.=1) up to the one whose order of priority is m (the proportion of contents determined to be important).

For example, a graph 410 means that the 43 contents from the content with a degree of priority of 1 up to the content at the position of the degree of priority of 43 indicated on the horizontal axis include 90% of contents determined to be important among the contents belonging to the set V. This means that, by giving degrees of priority to the 200 contents belonging to the set V being a search result and reviewing the 43 contents with high degrees of priority among these contents with use of the present embodiment, it is possible to find 90% of the contents that are important (have high degrees of priority) in the set V.

Moreover, by reviewing the 100 contents in descending order of priority, the operator can find 100% of the contents determined to be important among the contents belonging to the set V. Thus, in accordance with the present embodiment, it is possible to the operator with the degrees of priority of contents such that the operator can efficiently review contents among the 200 contents included in the set V being a search result.

Figure 5A:
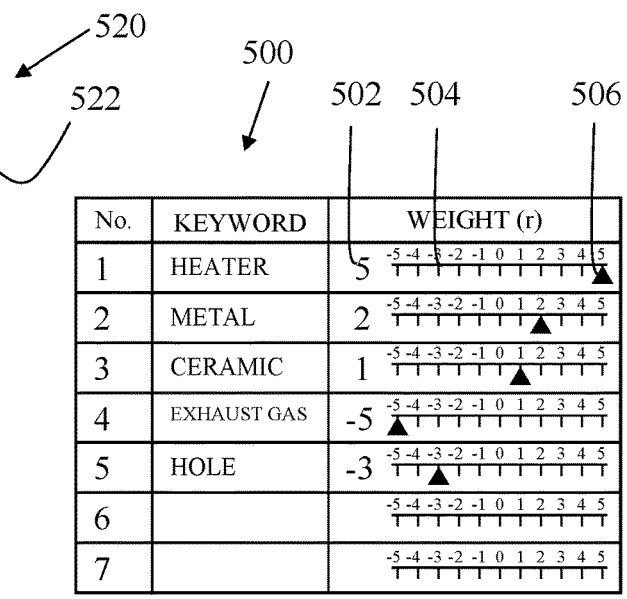
FIGS. 5A and 5B illustrate an example of a user interface that assists the operator to change selected keywords and change the corresponding weights.
Figure 5B:
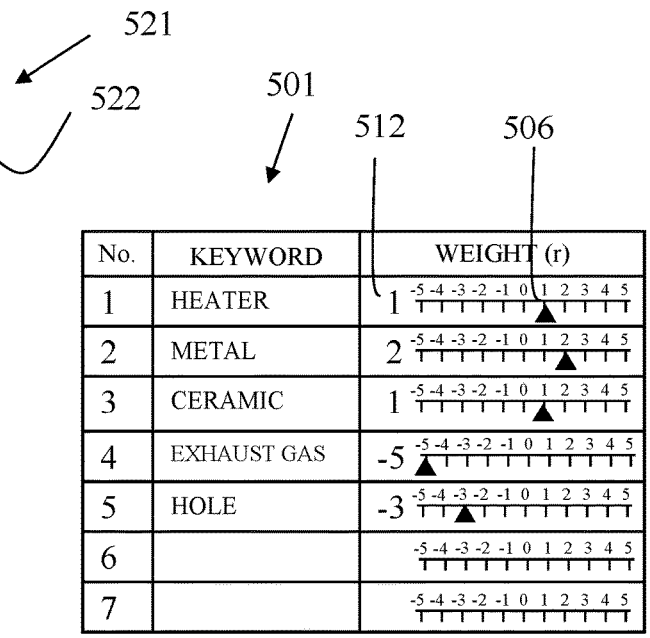

FIGS. 5A and 5B illustrate an example of a user interface that assists the operator to change selected keywords and change the corresponding weights.

FIGS. 5A and 5B assume a case where 17 contents have been reviewed among the 200 contents included in the set V. Assume, for example, that six contents among these have been determined to be closely related to the operator's purpose and important (the positive set R1 in FIGS. 1A and 1B), eight contents have been determined to be not related to the operator's purpose and not important (the negative set G1 in FIGS. 1A and 1B), and three contents have been determined to belong to other categories (the other set T1 in FIGS. 1A and 1B).

A table 520 of the reviewed contents in FIG. 5A is a table in which the reviewed contents are listed in descending order of their Total(m). A column i displays black, white, and hatched cells corresponding to the sets to which the contents belong illustrated in FIGS. 1A and 1B (R1, G1, or T1), respectively. Checking the identifications in this column i, the operator can correct keywords listed in the table 520 or the corresponding weights such that the contents belonging to the positive set R1 are listed as high as possible in the table 520. Since the contents belonging to the positive set R1 among the reviewed documents are listed at high positions in the table 520, it is possible to increase the possibility that the Total(m) of each positive content among the contents yet to be reviewed can be set to a higher value. This means that it is possible to increase the possibility of raising the priority of presentation of the positive content yet to be reviewed.

A table 500 of FIG. 5A lists positive keywords and negative keywords that have been designated, and corresponding weights 502. The operator can add new keywords to and delete keywords from the table 520. In addition, a user interface may be provided on which the operator can slide a mark 506 on a slide bar 504 sideways with a mouse or the like to change the weight. Alternatively, the configuration may be such that the operator can change the weight by typing keys or doing the like.

Incidentally, setting the weight to zero has the same effect as deleting the keyword (i.e., excluding the keyword from consideration).

FIG. 5B is a diagram illustrating a state where the order of contents has been changed according to the changes in Total(m) and the display of the column i resulting from changing the weight of a keyword.

A table 501 of the reviewed contents in FIG. 5B illustrates an example in which the position of the mark 506 for the keyword "heater" in the table 500 of the reviewed contents in FIG. 5A has been moved to "1" from "5" to change the weight to "1" from "5". How the order of the contents listed in a table 521 of FIG. 5B has been changed according to the values of their Total(m) in response to this change in the weight is illustrated.

It can be seen that, in the table 521 of the reviewed contents in FIG. 5B, more positive contents in the positive set R1 among the reviewed contents are listed at higher positions than those in the table 520 of the reviewed contents in FIG. 5A. It can also be seen that the content at the lowest position in the positive set in the table 520 of FIG. 5A (m=112) has risen from the 11th position in the table 520 of FIG. 5A to the 7th position in the table 521 of FIG. 5B.

Thus, the operator can easily recognize that the pattern of correspondence between the plurality of keywords and the corresponding weights in the table 501 of FIG. 5B is more preferable than the pattern in the table 500 of FIG. 5A.

Although description of deletion and addition of keywords with a drawing is omitted, those skilled in the art can understand that the arrangement of the contents will change according to correction of a keyword(s).

The operator can attempt to correct keywords or correct the corresponding weights as appropriate such that many of the contents belonging to the positive set R1 among the reviewed contents are arranged at high positions in the list of contents in the table 521 of FIG. 5B.

The user interface of FIGS. 5A and 5B is an example, and the user interface is not limited to this example. In FIGS. 5A and 5B, the table 520 of FIG. 5A and the table 521 of FIG. 5B include only the reviewed contents, but may include all of the contents belonging to the set V. In this case too, the operator may correct keywords or correct weights such that the reviewed contents belonging to the positive set R1 are listed as high as possible in the table. Alternatively, the operator may correct keywords or correct weights such that the position of the content at the lowest position among the reviewed contents belonging to the positive set R1 goes up as much as possible.

Then, the pattern of the keywords and the corresponding weights recognized as preferable by the operator is determined. The determined pattern is used to provide the total (i.e., a degree of priority) of each content belonging to the set V to the operator. By reviewing the contents in descending order of priority, the operator can preferentially review the contents inferred to be important to the operator.

Figure 6A:
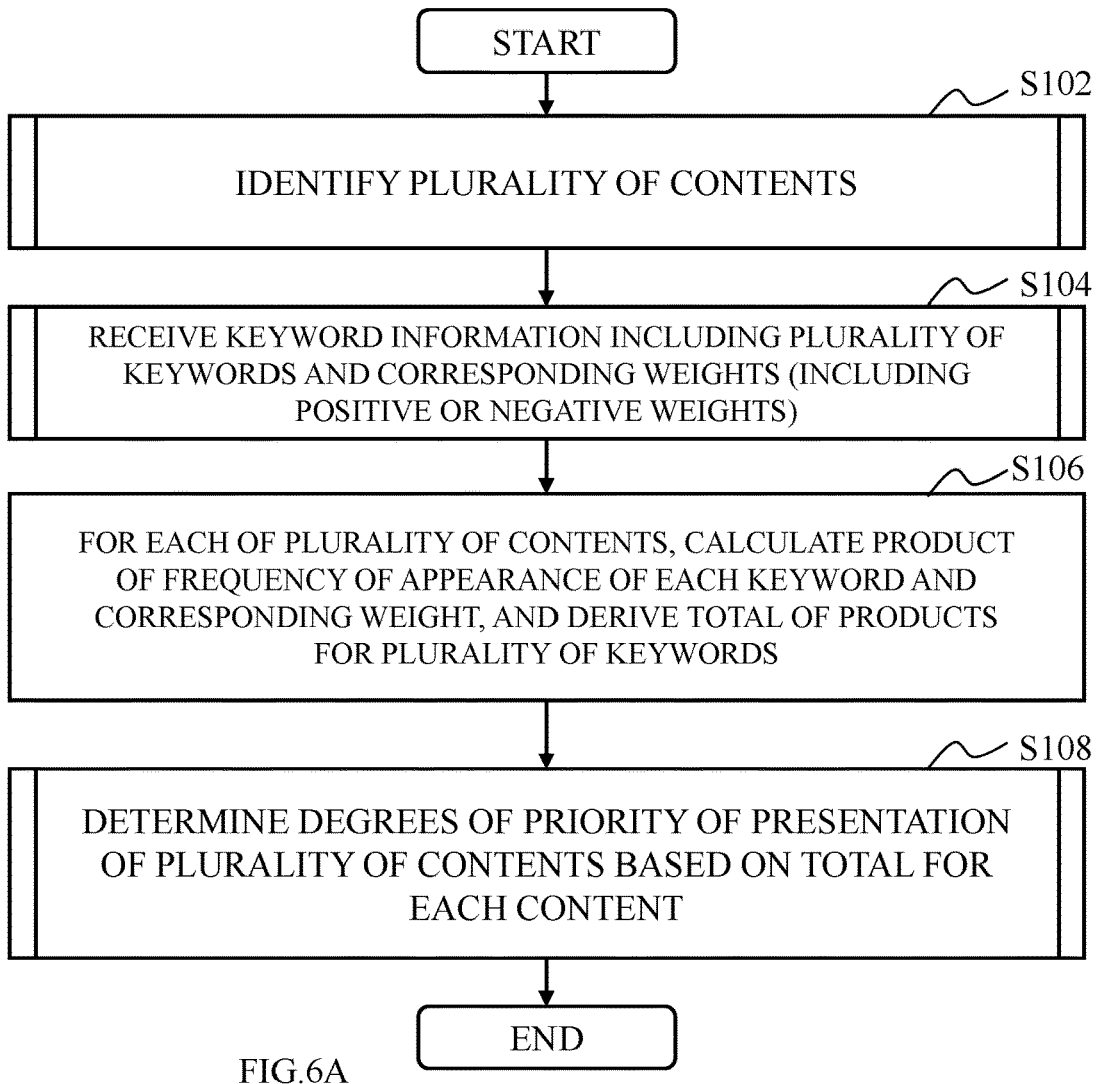
FIG. 6A illustrates a flow of processing in Embodiment 1.

FIG. 6A illustrates a flow of processing in Embodiment 1. The flow of processing illustrated in FIG. 6A will be described below.

[Step S102] A plurality of contents (i.e., the contents belonging to the set V) are identified. For example, the operator obtains the set V being a search result from the content population U by using a search formula to thereby identify a plurality of target contents.

[Step S104] Keyword information including a plurality of keywords and corresponding weights (including positive or negative weights) is received.

[Step S106] For each of the plurality of contents, the product of the frequency of appearance of each keyword and the corresponding weight is calculated, and the total of the products for the plurality of keywords is derived.

[Step S108] The degrees of priority of presentation of the plurality of contents are determined based on the total for each of the contents. Note that these totals (degrees of priority) are not limited to the degrees of priority in terms of the order in which the plurality of contents are presented to the operator. For example, the contents may be displayed to the operator along with their totals (degrees of priority) so that the operator can recognize the estimated degrees of importance of the displayed contents.

Based on the total (degree of priority) for each content obtained by the above process, the operator can efficiently process the contents belonging to the set V.

Figure 6B:
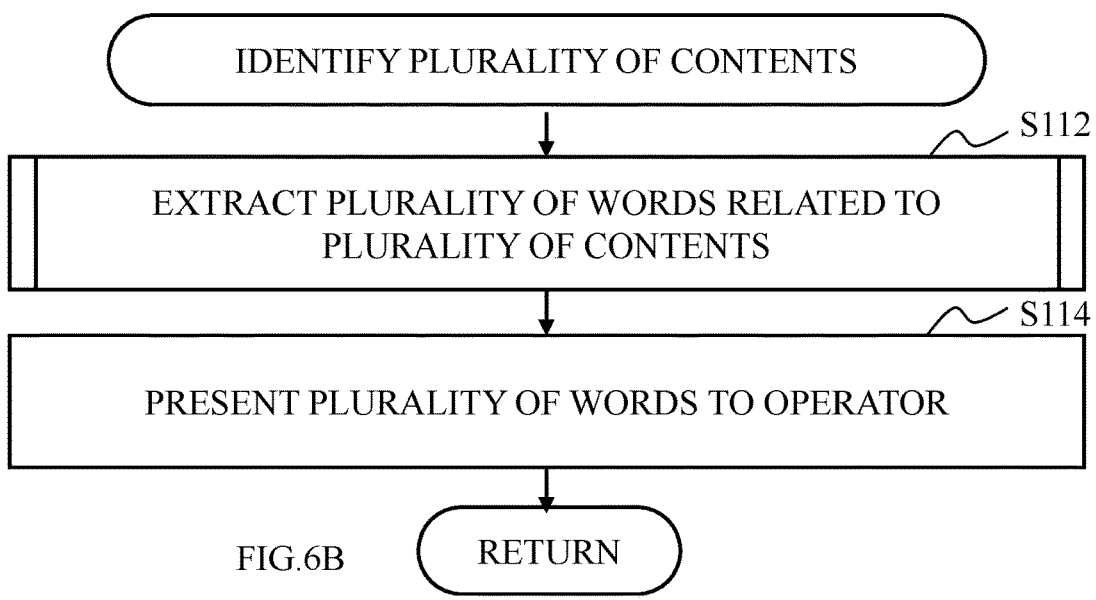
FIG. 6B is a flowchart illustrating details of the process of step S102 of identifying a plurality of contents.

FIG. 6B is a flowchart illustrating details of the process of step S102 of identifying a plurality of contents. That process will be described below.

[Step S112] A plurality of words related to a plurality of contents are extracted. The plurality of contents may be all of the contents belonging to the set V or some of the contents. Alternatively, words may be extracted from part of the contents (e.g., claims in the case of patent documents).

[Step S114] The plurality of extracted words are presented to the operator. Positive keywords or negative keywords may be identified based on the presented words. Alternatively, positive keywords or negative keywords determined by the operator themself may be identified.

Presenting the words to the operator makes it easier for the operator to identify positive keywords or negative keywords.

Figure 7:
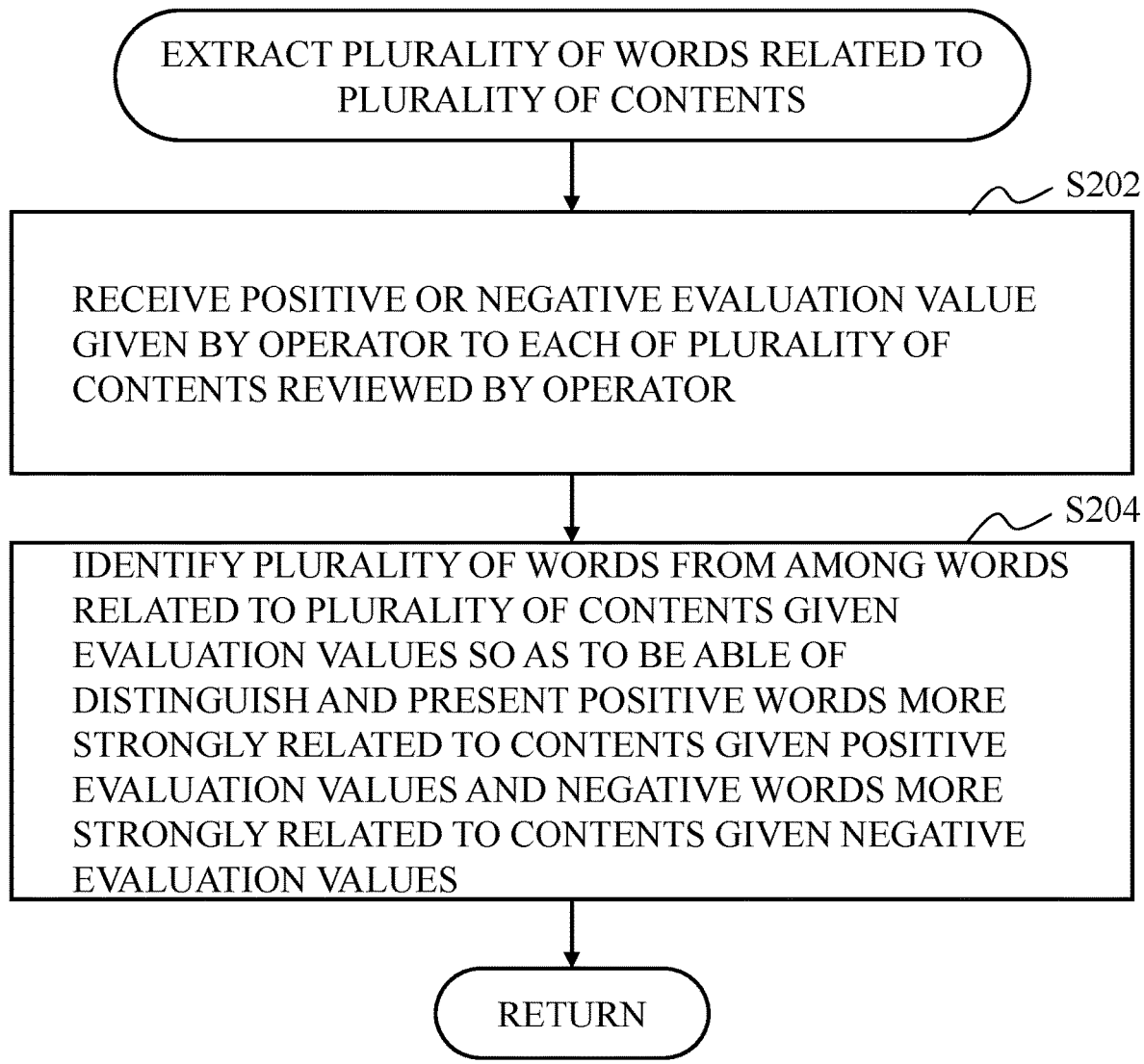
FIG. 7 is a flowchart illustrating details of the process of step S112 of extracting a plurality of words related to the plurality of contents.

FIG. 7 is a flowchart illustrating details of the process of step S112 of extracting a plurality of words related to the plurality of contents. That process will be described below.

[Step S202] A positive or negative evaluation value given by the operator to each of a plurality of contents reviewed by the operator is received. By this process, the positive set R1 and the negative set G1 illustrated in FIGS. 1A and 1B are identified. The other set T1 may be identified. Incidentally, it is not necessarily essential to identify the other set T1.

[Step S204] A plurality of words are identified from among words related to the plurality of contents given the evaluation values so as to be able of distinguish and present positive words more strongly related to the contents given the positive evaluation values and the negative words more strongly related to the contents given the negative evaluation values.

As already described with reference to FIGS. 2A, 2B, 3A, and 3B, this process makes it easier for the operator to determine positive keywords or negative keywords, or the weights for these.

Figure 8A:
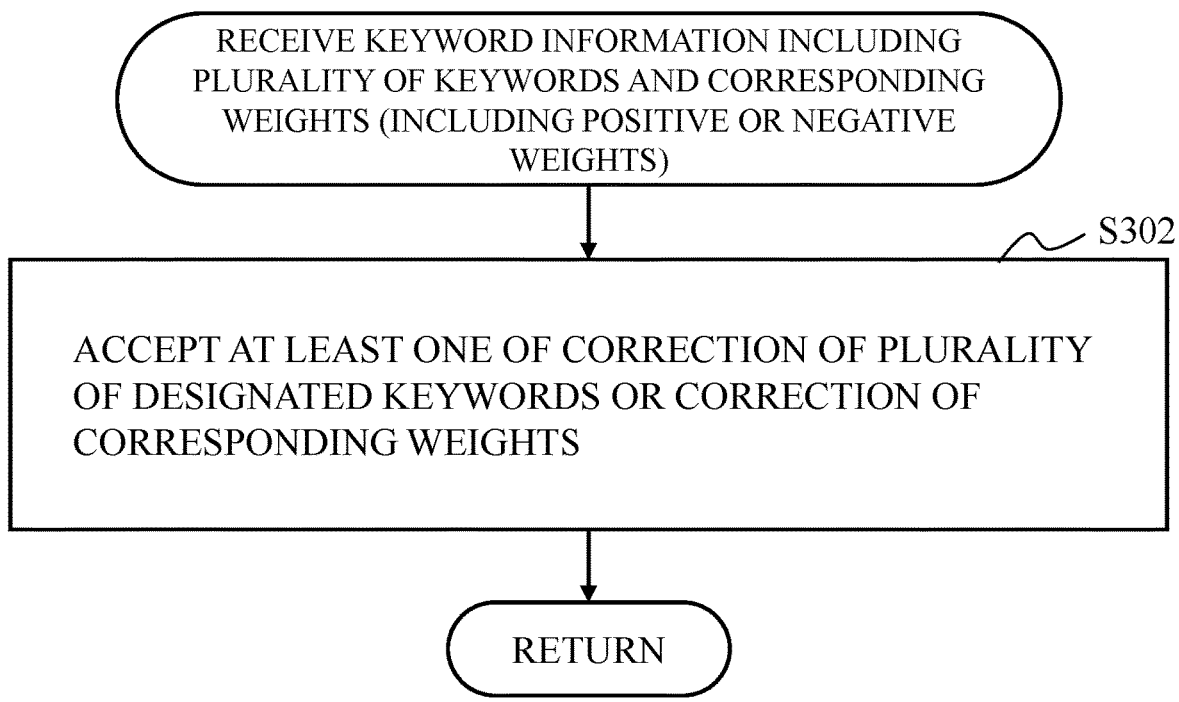
FIG. 8A is a flowchart illustrating details of the process of step S104 of receiving keyword information including a plurality of keywords and corresponding weights (including positive or negative weights).

FIG. 8A is a flowchart illustrating details of the process of step S104 of receiving the keyword information including a plurality of keywords and corresponding weights (including positive or negative weights). That process will be described below.

[Step S302] At least one of correction of a plurality of designated keywords or correction of the corresponding weights is accepted. By this process, more preferable keywords (positive keywords or negative keywords) or corresponding weights are obtained.

Figure 8B:
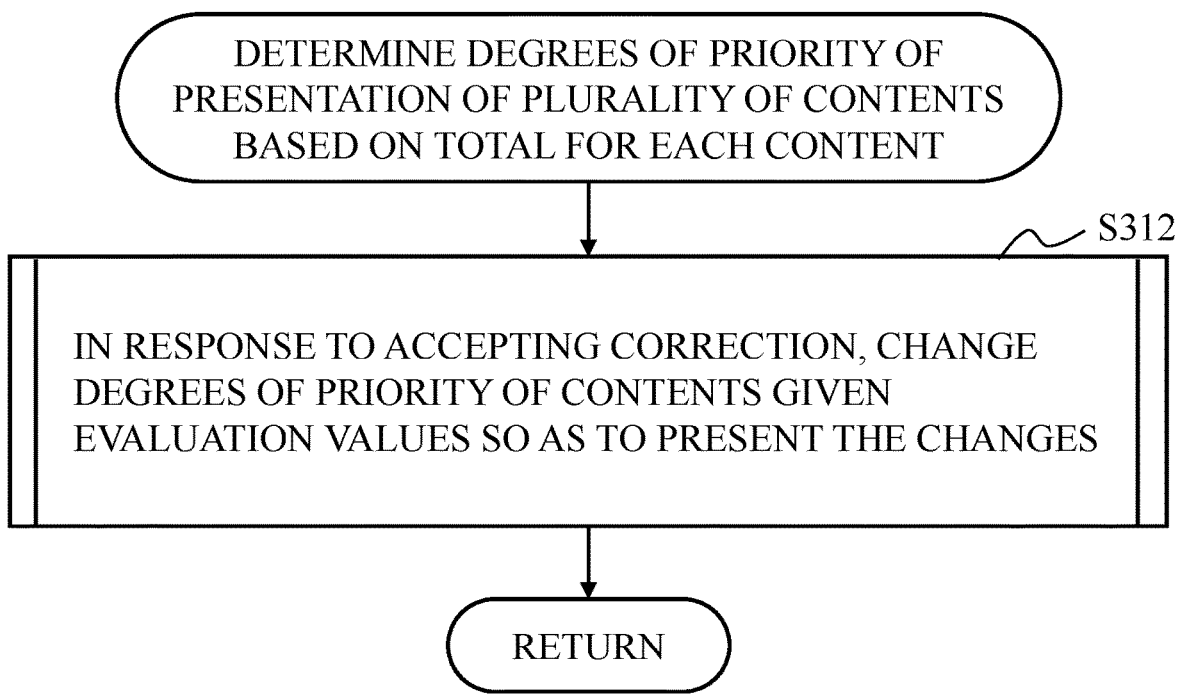
FIG. 8B is a flowchart illustrating details of the process of step S108 of determining the degrees of priority of presentation of the plurality of contents based on totals for the contents.

FIG. 8B is a flowchart illustrating details of the process of step S108 of determining the degrees of priority of presentation of the plurality of contents based on the total for each of the contents. That process will be described below.

[Step S312] In response to accepting the correction, the degrees of priority of the contents given evaluation values are changed so as to present the changes.

By this process, a degree of priority that is desirable for the operator is given to each content belonging to the set V.

The operator can efficiently perform reviewing of the contents and the like by using these degrees of priority.

Figure 9:
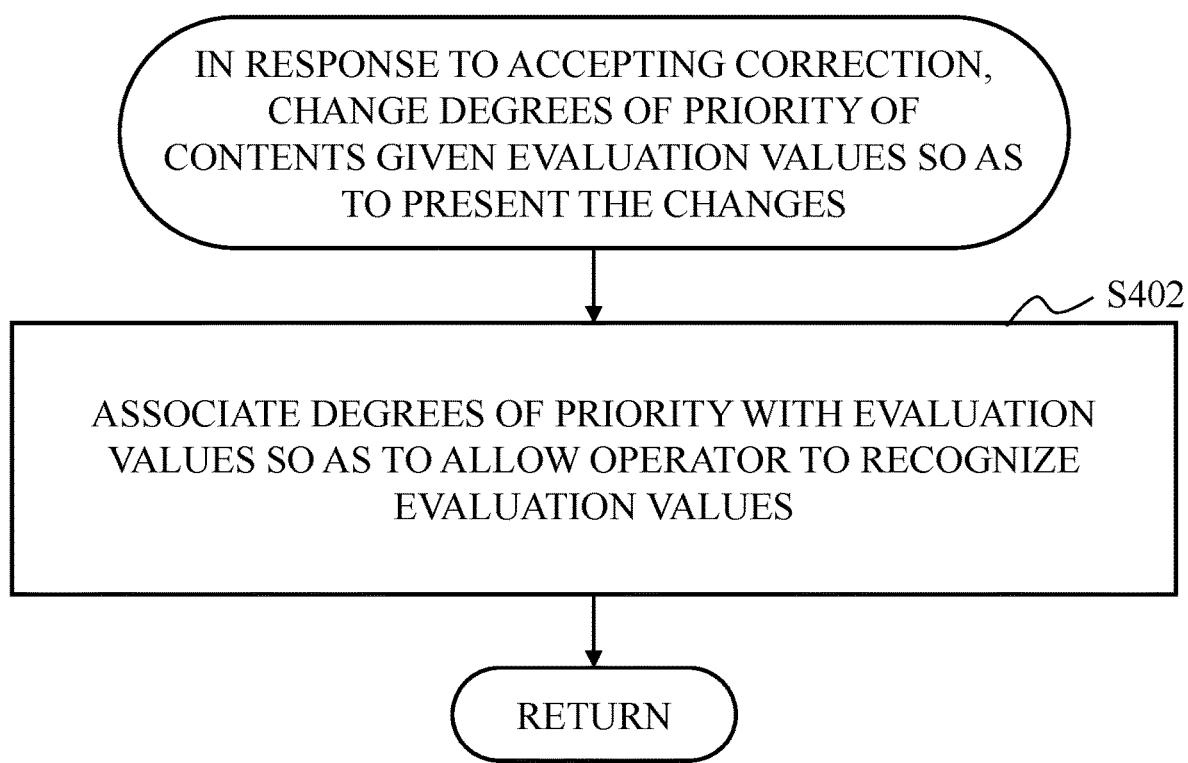
FIG. 9 is a flowchart illustrating details of the process of step S312 of changing the degrees of priority of contents given evaluation values so as to present the changes in response to accepting correction.

FIG. 9 is a flowchart illustrating details of the process of step S312 of changing the degrees of priority of the contents given evaluation values so as to present the changes in response to accepting correction. That process will be described below.

[Step S402] The degrees of priority are associated with the evaluation values so as to allow the operator to recognize the evaluation values. As described with reference to FIGS. 5A and 5B, by performing this process, the operator can correct keywords (positive keywords or negative keywords) or determine the corresponding weights such that the totals (degrees of priority) for the contents belonging to the positive set R1 will have as high degrees of priority as possible.

Embodiment 2

Embodiment 2 is an embodiment capable of lessening the burden on the operator for the selection of a plurality of keywords, the identification of the weight pattern, and/or the like. Specifically, Embodiment 2 is capable of automatically selecting a plurality of keywords and/or identifying the weight pattern. Note that, if an instruction is given from the operator, that instruction may be applied to select a plurality of keywords and/or identify the weight pattern.

Figure 10:
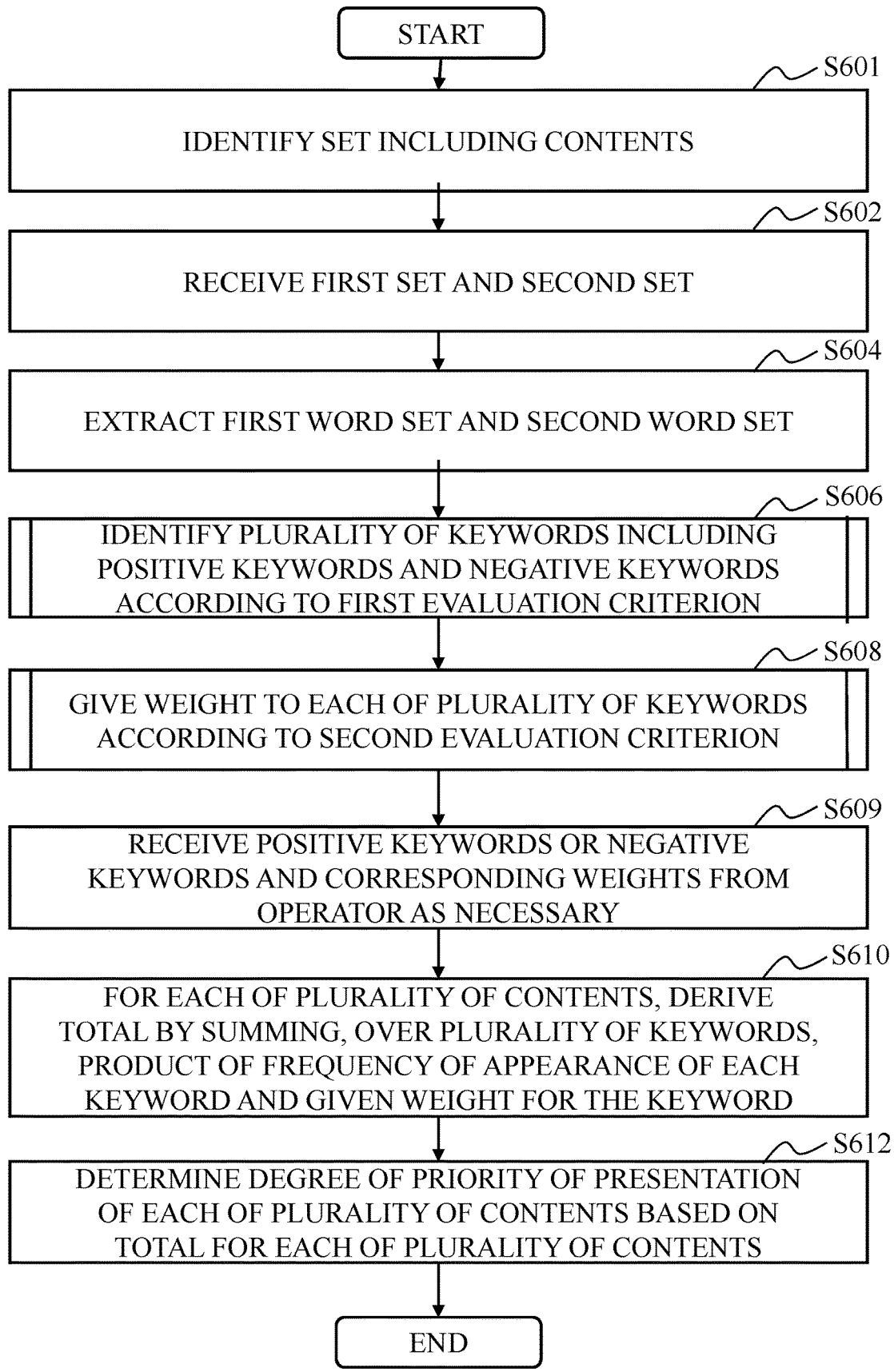
FIG. 10 is a flowchart of processing in Embodiment 2.

FIG. 10 illustrates a flowchart of processing in Embodiment 2. The flow of the processing in FIG. 10 will be described below.

[Step S601] A plurality of contents (i.e., the contents belonging to the set V) are identified. For example, the operator obtains the set V being a search result from the content population U by using a search formula to thereby identify a plurality of target contents.

[Step S602] A first set and a second set are received. This step is based on the assumption that at least some of the plurality of contents belonging to the set V being a search result have been reviewed. Moreover, the first set means the positive set R1, which has been reviewed, as illustrated in FIGS. 1A and 1B. The second set means the negative set G1, which has been reviewed, as illustrated in FIGS. 1A and 1B. Incidentally, the other set T1 illustrated in FIGS. 1A and 1B may be received in this step.

[Step S604] A first word set and a second word set are extracted. The first word set means the set of words included in the contents belonging to the first set. The second word set means the set of words included in the contents belonging to the second set. The words included in the first word set may also be included (there is a possibility of being included) in the second set. The words included in the second word set may also be included (there is a possibility of being included) in the first set.

It is possible to predict that the first word set is likely to include many positive words that appear frequently in positively evaluated documents. It is possible to predict that the second word set is likely to include many negative words that appear frequently in negatively evaluated documents.

[Step S606] A plurality of keywords including positive keywords and negative keywords are identified according to a first evaluation criterion. Here, one or two or more of various evaluation criteria may be employed as the first evaluation criterion. The first evaluation criterion will be specifically described later.

Incidentally, in this step, positive keywords or negative keywords designated by the operator may be received.

[Step S608] A weight is given to each of the plurality of keywords according to a second evaluation criterion. Of the plurality of keywords identified in step S606, each of the positive keywords is desirably given a weight of zero or more. Moreover, each of the negative keywords is desirably given a weight of zero or less. Furthermore, the pattern of the weights to be given to the plurality of keywords is desirably determined according to the second evaluation criterion.

Incidentally, specific examples of the second evaluation criterion will be described later. In this step, weights corrected by the operator may be received.

[Step S609]
Positive keywords or negative keywords and corresponding weights may be received from the operator as necessary. The receiving of keywords and weights has been described in Embodiment 1. This process makes it possible to select keywords and set corresponding weights based on the operator's knowledge, and thus perform a more appropriate process that matches the operator's need.

[Step S610] For each of the plurality of contents, a total is derived by summing, over the plurality of keywords, a product of a frequency of appearance of each of the keywords and the given weight for the keyword.

[Step S612] The degree of priority of presentation of each of the plurality of contents is determined based on the total for each of the plurality of contents. A content whose total has a larger value is considered to be such a content that a positive keyword included in that content gives a stronger influence than a negative keyword. Thus, it can be inferred to be a content with a higher degree of importance.

By the process in FIG. 10, each of the plurality of contents belonging to the set V being a search result can be given a degree of priority based on information on a plurality of reviewed contents. For example, by determining the order of reviewing the contents according to this degree of priority, contents that are inferred to have high degrees of importance can be preferentially presented to the operator. In this way, the operator can, for example, review contents inferred to have high degrees of importance at first. This enhances the efficiency of the operator's work such as reviewing the contents.

Figure 11:
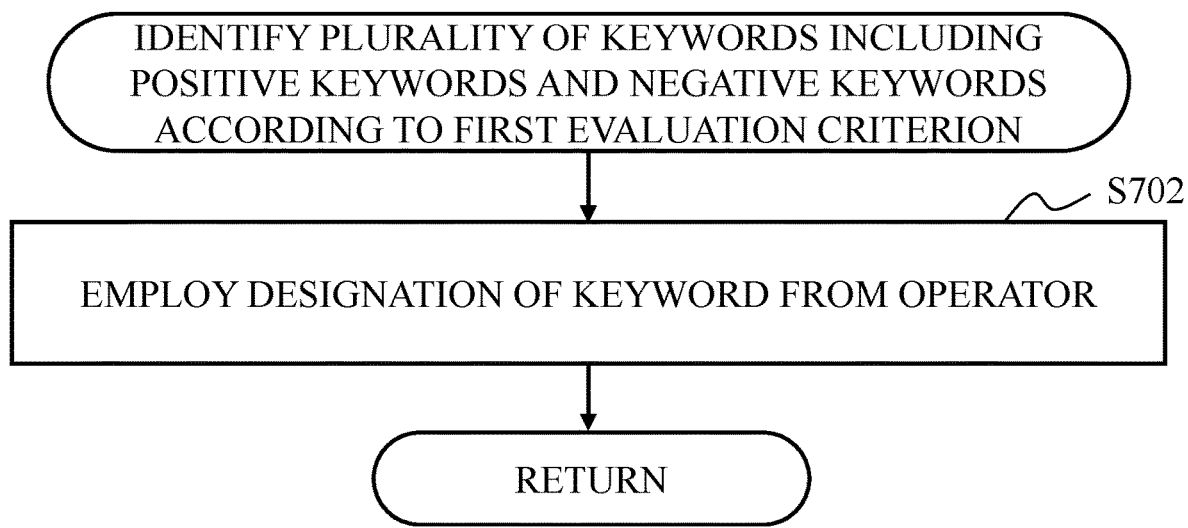
FIG. 11 is a flowchart illustrating further details of the process of step S606 of identifying a plurality of keywords including positive keywords and negative keywords according to a first evaluation criterion.

FIG. 11 is a flowchart illustrating further details of the process of step S606 of identifying a plurality of keywords including positive keywords and negative keywords according to the first evaluation criterion. This process will be described below.

[Step S702] Designation of keywords from the operator is employed. This specific example has already been described in Embodiment 1. Employing designation of keywords from the operator is an example of identifying keywords according to the first evaluation criterion.

Figure 12A:
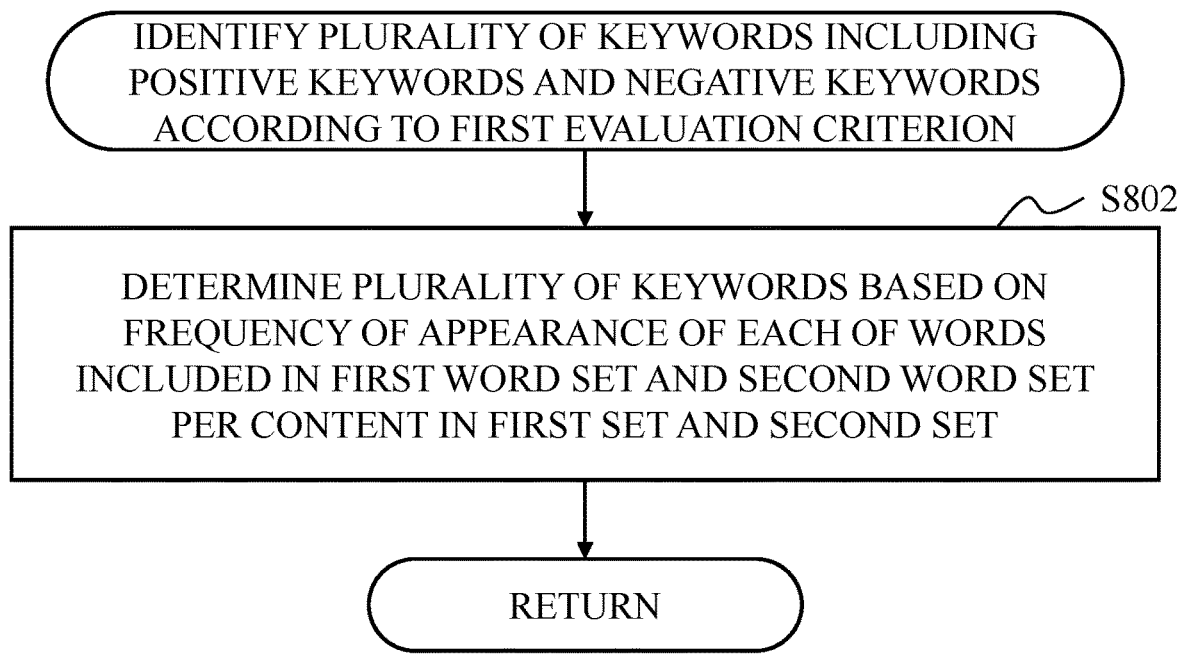
FIG. 12A is a flowchart illustrating further details of the process of step S606 of identifying a plurality of keywords including positive keywords and negative keywords according to the first evaluation criterion.

FIG. 12A is a flowchart illustrating further details of the process of step S606 of identifying a plurality of keywords including positive keywords and negative keywords according to the first evaluation criterion. This process will be described below.

[Step S802] The plurality of keywords are determined based on the frequency of appearance of each of the words included in the first word set and the second word set per content in the first set and the second set.

It is possible to infer that a word with a high frequency of appearance per content belonging to the first set is likely to be a candidate positive keyword. It is also possible to infer that a word with a high frequency of appearance per content belonging to the second set is likely to be a candidate negative keyword.

For example, a predetermined number of words may be identified in descending order of the frequency of appearance per content belonging to the first set as positive keywords. A predetermined number of words may be identified in descending order of the frequency of appearance per content belonging to the second set as negative keywords.

The determination in this step is an example of the determination based on the first evaluation criterion.

Figure 12B:
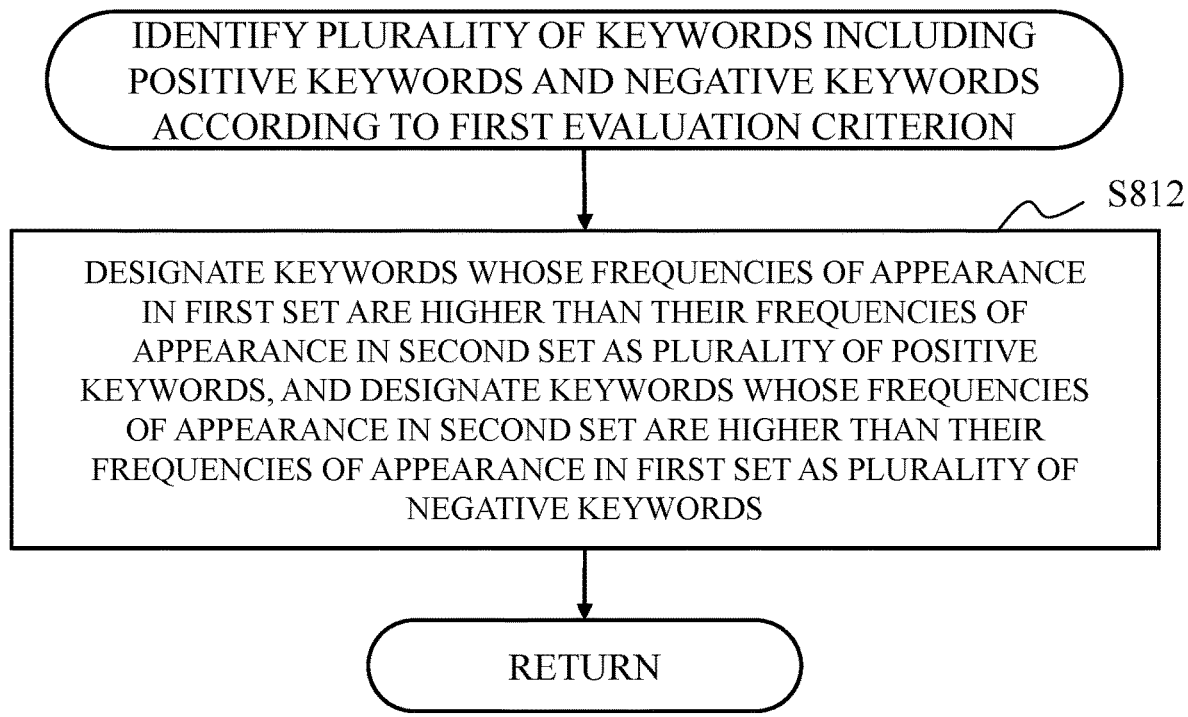
FIG. 12B is a flowchart illustrating further details of the process of step S606 of identifying a plurality of keywords including positive keywords and negative keywords according to the first evaluation criterion.

FIG. 12B is a flowchart illustrating further details of the process of step S606 of identifying a plurality of keywords including positive keywords and negative keywords according to the first evaluation criterion. This process will be described below.

[Step S812] Keywords whose frequencies of appearance per content in the first set are higher than their frequencies of appearance per content in the second set can be designated as a plurality of positive keywords, and keywords whose frequencies of appearance per content in the second set are higher than their frequencies of appearance per content in the first set can be designated as a plurality of negative keywords.

When the frequency of appearance of a word per content belonging to the first set is higher than its frequency of appearance per content belonging to the second set, that word can be inferred to be a word that is associated more closely with the contents belonging to the first set than with the contents belonging to the second set. Thus, this word can be inferred to be a possible candidate that may be identified as a positive keyword.

Also, when the frequency of appearance of a word per content belonging to the second set is higher than its frequency of appearance per content belonging to the first set, that word can be inferred to be a word that is associated more closely with the contents belonging to the second set than with the contents belonging to the first set. Thus, this word can be inferred to be a possible candidate that may be identified as a negative keyword.

For example, a predetermined number of words may be selected in descending order of the difference between the frequencies of appearance to identify positive keywords and negative keywords.

The determination in this step is an example of the determination based on the first evaluation criterion.

Figure 13:
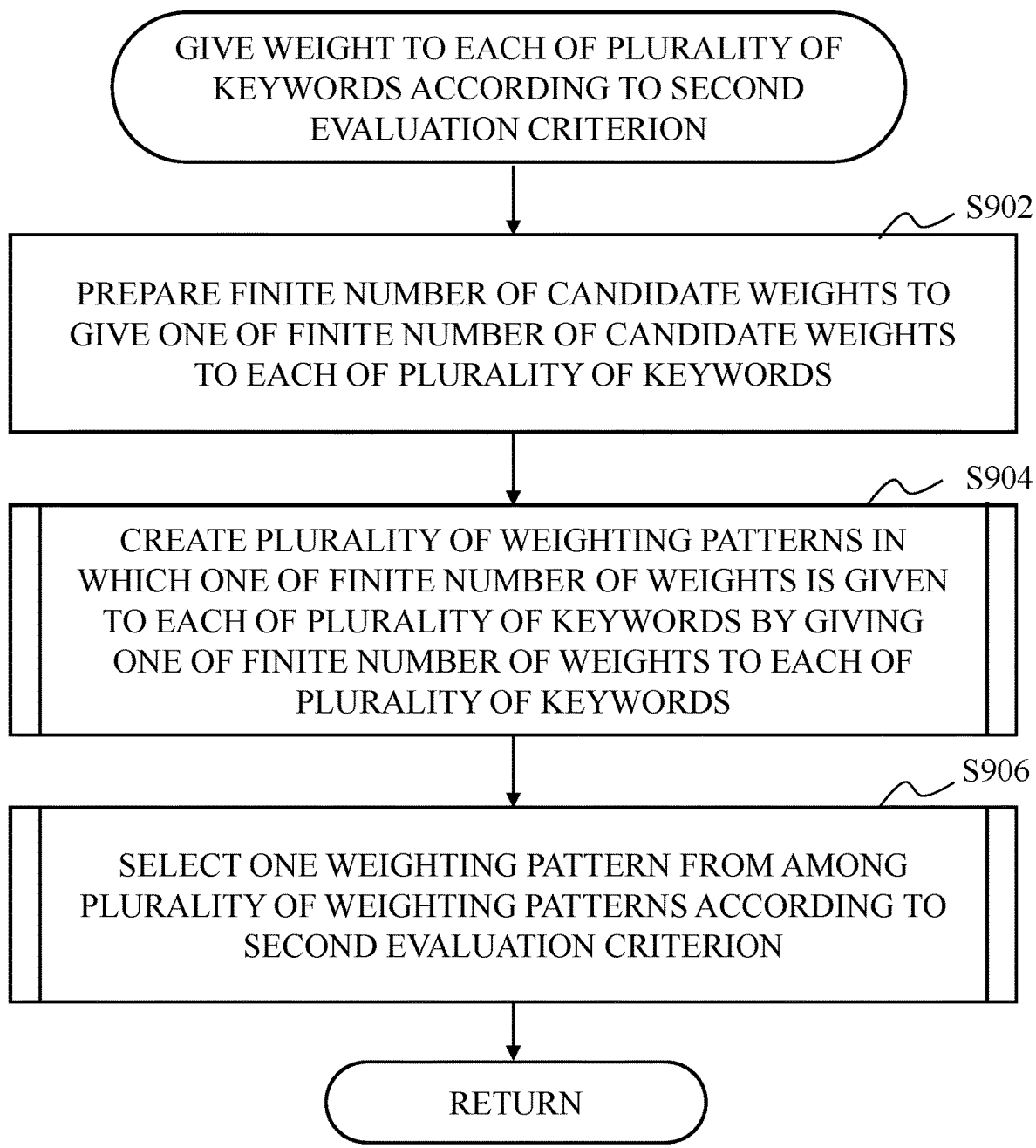
FIG. 13 is a flowchart illustrating further details of the process of step S608 of giving a weight to each of the plurality of keywords according to a second evaluation criterion.

FIG. 13 is a flowchart illustrating further details of the process of step S608 of giving a weight to each of the plurality of keywords according to the second evaluation criterion. This process will be described below.

[Step S902] A finite number of candidate weights are prepared to give one of the finite number of candidate weights to each of the plurality of keywords. For example, three weights (5, 3, 1) may be prepared in advance as the weights for the positive keywords. Moreover, for example, three weights (−5, −3, −1) may be prepared in advance as the weights for the negative keywords. Note that zero may be included as a weight.

[Step S904] A plurality of weighting patterns in which one of the finite number of weights is given to each of the plurality of keywords are created by giving one of the finite number of weights to each of the plurality of keywords.

These weighting patterns may be created such that the plurality of keywords and the plurality of weights are comprehensively paired.

[Step S906] One weighting pattern is selected from among the plurality of weighting patterns according to the second evaluation criterion. Incidentally, the second evaluation criterion will be described later.

Figure 14:
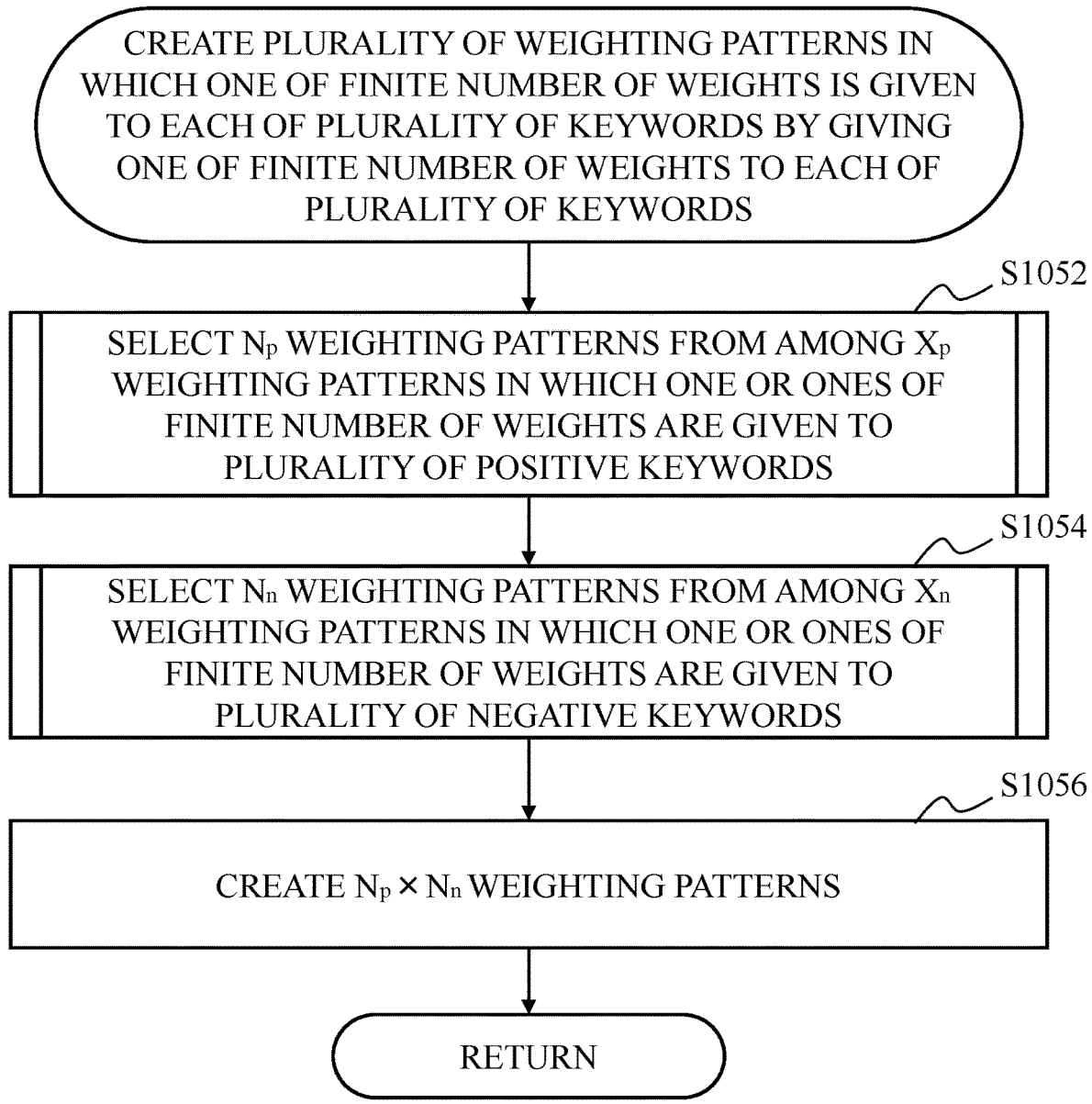
FIG. 14 is a flowchart illustrating further details of the process of step S904 of creating a plurality of weighting patterns in which one of the finite number of weights is given to each of the plurality of keywords by giving one of the finite number of weights to each of the plurality of keywords.

FIG. 14 is a flowchart illustrating further details of the process of step S904 of creating a plurality of weighting patterns in which one of the finite number of weights is given to each of the plurality of keywords by giving one of the finite number of weights to each of the plurality of keywords. This process will be described below.

[Step S1052] $N_p$ weighting patterns are selected from among $X_p$ weighting patterns in which one or ones of the finite number of weights are given to the plurality of positive keywords. If the number of the $X_p$ weighting patterns in which one or ones of the finite number of weights are given to the plurality of positive keywords is relatively large, the amount of calculation to select appropriate weighting patterns will be large. Thus, $N_p$ weighting patterns may be selected from among $X_p$ weighting patterns. This selection method will be described later.

[Step S1054] $N_n$ weighting patterns are selected from among $X_n$ weighting patterns in which one or ones of the finite number of weights are given to the plurality of negative keywords. If the number of the $X_n$ weighting patterns in which one or ones of the finite number of weights is given to the plurality of negative keywords is relatively large, the amount of calculation to select appropriate weighting patterns will be large. Thus, $N_n$ weighting patterns may be selected from among $X_n$ weighting patterns. This selection method will be described later.

[Step S1056] $N_p \times N_n$ weighting patterns are created. In this process, $X_p \times X_n$ weighting patterns may be an extremely large number of weighting patterns and require an extremely large amount of calculation to determine weighting patterns. Thus, $N_p \times N_n$ weighting patterns are created. Selecting appropriate weighting patterns reduces the amount of calculation.

By the above process, an appropriate number of weighting pattern candidates are prepared.

FIG. 15A is a flowchart illustrating details of the process of step S1052 of selecting $N_p$ weighting patterns from among $X_p$ weighting patterns in which one or ones of the finite number of weights are given to the plurality of positive keywords. This process will be described below.

[Step S1102] By sequentially applying the $X_p$ weighting patterns, a total A is obtained for each of the plurality of contents included in the first set by summing, over the plurality of positive keywords, a product of a frequency of appearance of each of the plurality of positive keywords and the given weight for the each of the plurality of positive keywords, and the totals A for the plurality of contents included in the first set are summed to obtain a sum SA, thereby obtaining $X_p$ sums SA corresponding respectively to the $X_p$ weighting patterns.

[Step S1104] $N_p$ sums SA are identified from among the $X_p$ sums SA in descending order to select the $N_p$ weighting patterns corresponding respectively to the identified $N_p$ sums SA.

It is possible to determine that a content with a larger value of SA has a larger number of positive keywords, has a larger weight(s), or has both. Thus, it is possible to presume that applying this weighting pattern to unknown contents further increases the likelihood of extracting positive contents.

Accordingly, by selecting $N_p$ weighting patterns with large values of SA among the $X_p$ weighting patterns, a smaller number of weighting patterns will be handled.

FIG. 15B is a flowchart illustrating details of the process of step S1054 of selecting $N_n$ weighting patterns from among $X_n$ weighting patterns in which one or ones of the finite number of weights is given to the plurality of negative keywords. This process will be described below.

[Step S1122] By sequentially applying the $X_n$ weighting patterns, a total D is obtained for each of the plurality of contents included in the second set by summing, over the plurality of negative keywords, a product of a frequency of appearance of each of the plurality of negative keywords and the given weight for the each of the plurality of negative keywords, and the totals D for the plurality of contents included in the second set are summed to obtain a sum SD, thereby obtaining $X_n$ sums SD corresponding respectively to the $X_n$ weighting patterns.

[Step S1124] $N_n$ sums SD are identified from among the $X_n$ sums SD in ascending order to select the $N_n$ weighting patterns corresponding respectively to the identified $N_n$ sums SD.

It is possible to determine that a content with a smaller value of SD (negative value) has a larger number of negative keywords, has a smaller weight(s), or has both. Thus, it is possible to presume that applying this weighting pattern to unknown contents further increases the likelihood of further lowering the degrees of priority of negative contents.

Accordingly, by selecting $N_n$ weighting patterns with small values of SD among the $X_n$ weighting patterns, a smaller number of weighting patterns will be selected.

FIG. 16A is a flowchart illustrating details of the process of step S1052 of selecting $N_p$ weighting patterns from among $X_p$ weighting patterns in which one or ones of the finite number of weights are given to the plurality of positive keywords. This process will be described below.

[Step S1202] By sequentially applying the $X_p$ weighting patterns, a total A is obtained for each of the plurality of contents included in the first set by summing, over the plurality of positive keywords, a product of a frequency of appearance of each of the plurality of positive keywords and the given weight for the each of the plurality of positive keywords, and a total $A_{pm}$ which is the smallest value among the totals A for the plurality of contents included in the first set is obtained, thereby obtaining $X_p$ totals $A_{pm}$ corresponding respectively to the $X_p$ weighting patterns.

[Step S1204] $N_p$ totals $A_{pm}$ are identified from among the $X_p$ totals $A_{pm}$ in descending order to select $N_p$ weighting patterns corresponding respectively to the identified $N_p$ totals $A_{pm}$.

It is possible to determine that a content with a larger value of $A_{pm}$ has a larger number of positive keywords, has a larger weight(s), or has both. Thus, it is possible to presume that applying this weighting pattern to unknown contents further increases the likelihood of extracting positive contents.

Accordingly, by selecting $N_p$ weighting patterns with large values of $A_{pm}$ among the $X_p$ weighting patterns, a smaller number of weighting patterns will be selected.

FIG. 16B is a flowchart illustrating details of the process of step S1054 of selecting $N_n$ weighting patterns from among $X_n$ weighting patterns in which one or ones of the finite number of weights is given to the plurality of negative keywords. This process will be described below.

[Step S1212] By sequentially applying the $X_n$ weighting patterns, a total $A_n$ is obtained for each of the plurality of contents included in the first set by summing, over the plurality of negative keywords, a product of a frequency of appearance of each of the plurality of negative keywords and the given weight for the each of the plurality of negative keywords, and a total $A_{nm}$ which is the smallest value among the totals $A_n$ for the plurality of contents included in the first set is obtained.

[Step S1214] $N_n$ totals $A_{nm}$ are identified from among the $X_n$ totals $A_{nm}$ in descending order to select $N_n$ weighting patterns corresponding respectively to the identified $N_n$ totals $A_{nm}$.

It is possible to determine that a content included in the first set with a larger value of $A_{nm}$ has a smaller number of negative keywords, has a larger weight(s), or has both. Thus, it is possible to presume that applying this weighting pattern to negative keywords in unknown contents further increases the likelihood of extracting positive contents.

Accordingly, by selecting $N_n$ weighting patterns with large values of $A_{nm}$ among the $X_n$ weighting patterns, a smaller number of weighting patterns will be selected.

Figure 17:
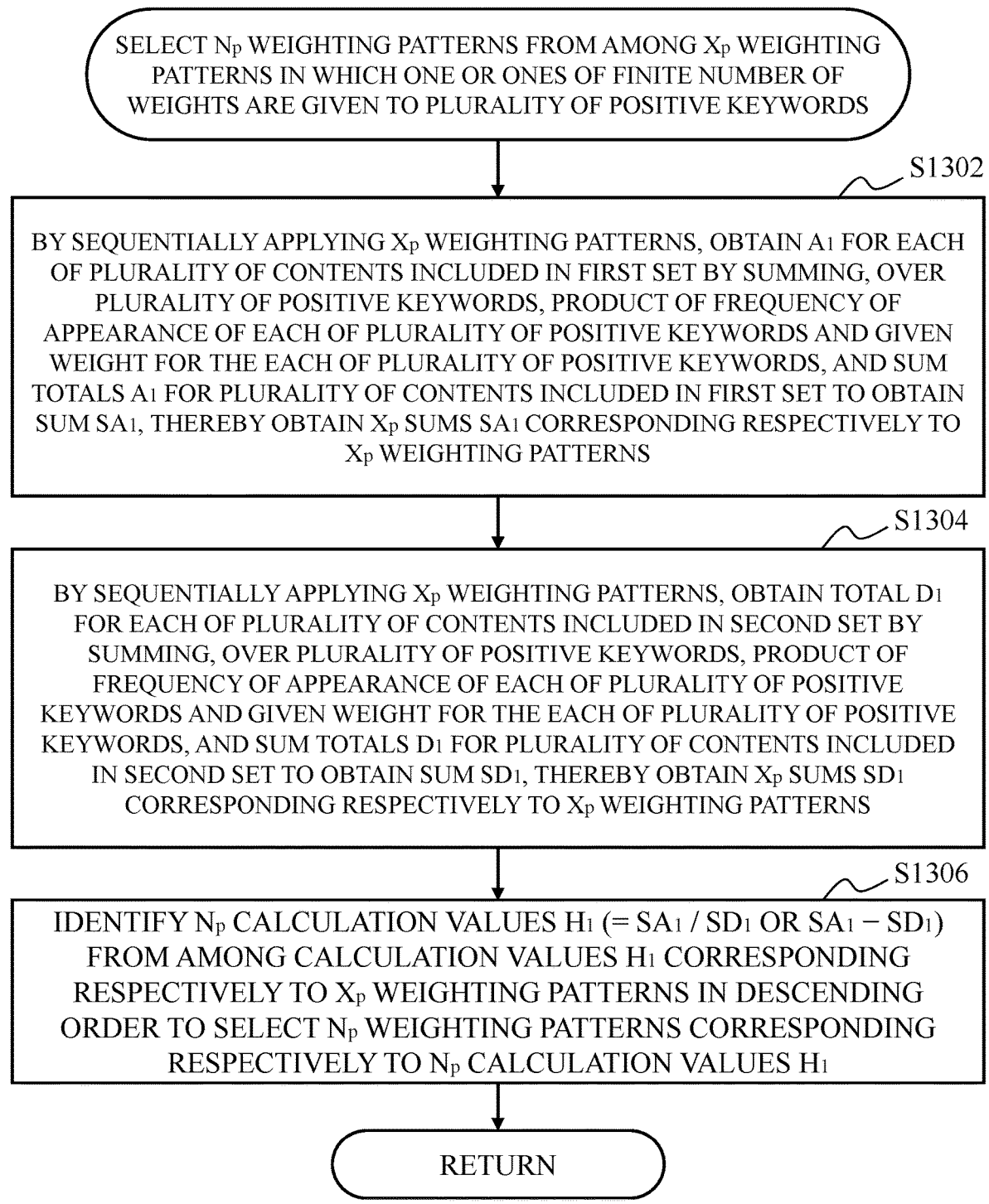
FIG. 17 is a flowchart illustrating details of the process of step S1052 of selecting $N_p$ weighting patterns from among $X_p$ weighting patterns in which one or ones of the finite number of weights are given to the plurality of positive keywords.

FIG. 17 is a flowchart illustrating details of the process of step S1052 of selecting $N_p$ weighting patterns from among $X_p$ weighting patterns in which one or ones of the finite number of weights are given to the plurality of positive keywords. This process will be described below.

[Step S1302] By sequentially applying the $X_p$ weighting patterns, a total $A_1$ is obtained for each of the plurality of contents included in the first set by summing, over the plurality of positive keywords, a product of a frequency of appearance of each of the plurality of positive keywords and the given weight for the each of the plurality of positive keywords, and the totals $A_1$ for the plurality of contents included in the first set are summed to obtain a sum $SA_1$, thereby obtaining $X_p$ sums $SA_1$ corresponding respectively to the $X_p$ weighting patterns.

[Step S1304] By sequentially applying the $X_p$ weighting patterns, a total $D_1$ is obtained for each of the plurality of contents included in the second set by summing, over the plurality of positive keywords, a product of a frequency of appearance of each of the plurality of positive keywords and the given weight for the each of the plurality of positive keywords, and the totals $D_1$ for the plurality of contents included in the second set are summed to obtain a sum $SD_1$, thereby obtaining $X_p$ sums $SD_1$ corresponding respectively to the $X_p$ weighting patterns.

[Step S1306] $N_p$ calculation values $H_1$ (=$SA_1/SD_1$ or $SA_1-SD_1$) are identified from among calculation values $H_1$ corresponding respectively to the $X_p$ weighting patterns in descending order to select $N_p$ weighting patterns corresponding respectively to the $N_p$ calculation values $H_1$.

It is possible to determine that a content in the first set with a larger calculation value $H_1$(=$SA_1/SD_1$ or $SA_1-SD_1$) has a larger number of positive keywords or a larger weight(s), and a content in the second set has a smaller number of positive keywords, has a smaller weight(s), or has both. Thus, it is possible to presume that applying this weighting pattern to unknown contents further increases the likelihood of extracting positive contents.

Accordingly, by selecting $N_p$ weighting patterns with large calculation values $H_1$ (=$SA_1/SD_1$ or $SA_1-SD_1$) among the $X_p$ weighting patterns, a smaller number of weighting patterns will be selected.

Figure 18:
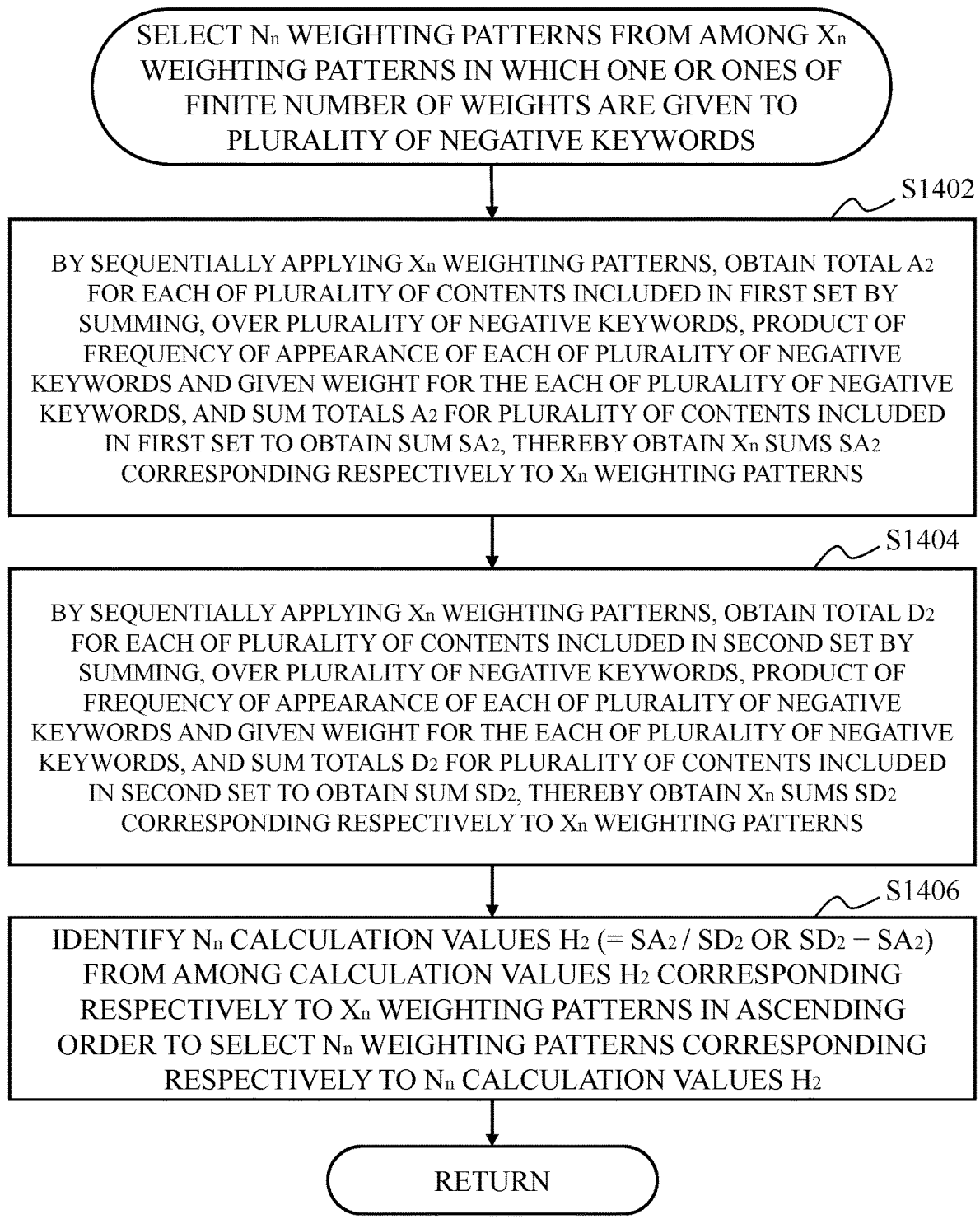
FIG. 18 is a flowchart illustrating details of the process of step S1054 of selecting $N_n$ weighting patterns from among $X_n$ weighting patterns in which one or ones of the finite number of weights is given to the plurality of negative keywords.

FIG. 18 is a flowchart illustrating details of the process of step S1054 of selecting $N_n$ weighting patterns from among $X_n$ weighting patterns in which one or ones of the finite number of weights is given to the plurality of negative keywords. This process will be described below.

[Step S1402] By sequentially applying the $X_n$ weighting patterns, a total $A_2$ is obtained for each of the plurality of contents included in the first set by summing, over the plurality of negative keywords, a product of a frequency of appearance of each of the plurality of negative keywords and the given weight for the each of the plurality of negative keywords, and the totals $A_2$ for the plurality of contents included in the first set are summed to obtain a sum $SA_2$, thereby obtaining $X_n$ sums $SA_2$ corresponding respectively to the $X_n$ weighting patterns.

[Step S1404] By sequentially applying the $X_n$ weighting patterns, a total $D_2$ is obtained for each of the plurality of contents included in the second set by summing, over the plurality of negative keywords, a product of a frequency of appearance of each of the plurality of negative keywords and the given weight for the each of the plurality of negative keywords, and the totals $D_2$ for the plurality of contents included in the second set are summed to obtain a sum $SD_2$, thereby obtaining $X_n$ sums $SD_2$ corresponding respectively to the $X_n$ weighting patterns.

[Step S1406] $N_n$ calculation values $H_2$ (=$SA_2/SD_2$ or $SD_2-SA_2$) are identified from among calculation values $H_2$ corresponding respectively to the $X_n$ weighting patterns in ascending order to select $N_n$ weighting patterns corresponding respectively to the $N_n$ calculation values $H_2$.

It is possible to determine that a content in the first set with a smaller calculation value $H_2$ (=$SA_2/SD_2$ or $SD_2-SA_2$) has a smaller number of negative keywords or a larger weight(s), and a content in the second set has a larger number of negative keywords, has a smaller weight(s), or has both. Thus, it is possible to presume that applying this weighting pattern to unknown contents further increases the likelihood of further lowering the degrees of priority of negative contents.

Accordingly, by selecting $N_n$ weighting patterns with small calculation values $H_2$ (=$SA_2/SD_2$ or $SD_2-SA_2$) among the $X_n$ weighting patterns, a smaller number of weighting patterns will be selected.

Figure 19:
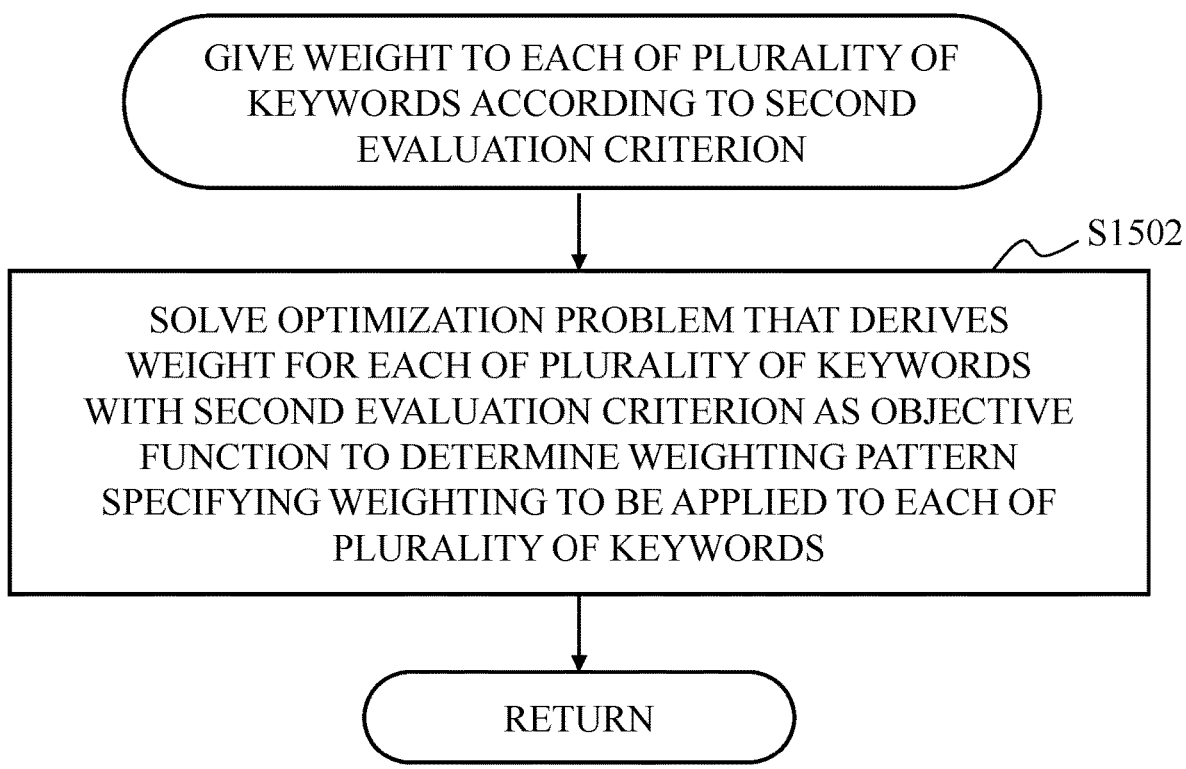
FIG. 19 is a flowchart illustrating further details of the process of step S608 of giving a weight to each of the plurality of keywords according to the second evaluation criterion.

FIG. 19 is a flowchart illustrating details of the process of step S608 of giving a weight to each of the plurality of keywords according to the second evaluation criterion. This process will be described below.

[Step S1502]

An optimization problem that derives the weight for each of the plurality of keywords is solved with the second evaluation criterion as an objective function. As a result, the plurality of keywords are identified, and a weighting pattern specifying the weighting to be applied to each of the plurality of identified keywords is determined.

Here, the method to solve the optimization problem is a matter well known to those skilled in the art, and detailed description thereof is therefore omitted.

To keep the calculation of the optimization problem from becoming long, it is possible to determine the maximum number of keywords, the maximum range of weights, and the like in advance. Alternatively, Embodiment 1 may be used to identify the keywords in advance.

FIG. 20 is a table illustrating examples of the second evaluation criterion. These will be described below.

(Variation 1)

The second evaluation criterion includes a criterion of a weighting pattern with which a sum $SA_3$ obtained by summing totals $A_3$ for the plurality of contents included in the first set is a largest value or a value close to the largest value, the totals $A_3$ each being obtained for one of the plurality of contents included in the first set by summing, over the plurality of keywords, a product of a frequency of appearance of each of the plurality of keywords and a possible value of the corresponding weight.

This evaluation criterion can be expressed with the following equation.

[Math. 2]

$$SA_3 = \sum_{content(m) \in R1} \text{Total}(m) \quad (2)$$

where
- R1: a set of contents given positive evaluations among the reviewed contents, i.e., the first set (see FIGS. 1A and 1B),
- content(m): m-th content, and
- Total(m): $A_3$ described above, which is the total obtained by summing the products of the frequencies of appearance of all keywords in content(m) and the weights for those keywords (see Equation (1)).

(Variation 2)

The second evaluation criterion includes a criterion of a weighting pattern with which a total $A_3m$ being a smallest value among totals $A_3$ is a largest value or a value close to the largest value, the totals $A_3$ each being obtained for one of the plurality of contents included in the first set by summing, over the plurality of keywords, a product of a frequency of appearance of each of the plurality of keywords and a possible value of the corresponding weight.

It is presumed that, when the total $A_3m$ being the smallest value among the totals $A_3$ is the largest value, the total $A_3$ for each content is more likely to be a large value. Thus, a desirable weight pattern is obtained.

(Variation 3)

The second evaluation criterion includes a criterion of a weighting pattern with which, when totals $A_4$ for the plurality of contents included in the first set and the second set are arranged in descending order, a position of the lowest total $A_4$ among the totals $A_4$ for the plurality of contents included in the first set is a highest position or a position close to the highest position, the totals $A_4$ each being obtained for one of the plurality of contents included in the first set and the second set by summing, over the plurality of keywords, a product of a frequency of appearance of each of the plurality of keywords and a possible value of the corresponding weight.

The weighting pattern with which the position of the lowest total $A_4$ among the totals $A_4$ is the highest position is a desirable weight pattern since it is presumed that each content is likely to be at a high position.

(Variation 4-1)

The second evaluation criterion includes a criterion of a weighting pattern with which a value of P/Q calculated by using a position P and a number Q is a largest value or a value larger than a predetermined value,
- where when totals $A_4$ for the plurality of contents included in the first set and the second set are arranged in descending order, the position P is a position of the lowest total $A_4$ among the totals $A_4$ for the plurality of contents included in the first set, the totals $A_4$ each being obtained for one of the plurality of contents included in the first set and the second set by summing, over the plurality of keywords, a product of a frequency of appearance of each of the plurality of keywords and a possible value of the corresponding weight, and
- the number Q is such a number of the plurality of contents included in the first set and the second set that a sum $SA_4$ obtained by summing the totals $A_4$ for the plurality of contents included in the first set is larger than a predetermined threshold.

In the case of using this evaluation criterion, the positive contents are presumed to be at high positions, and thus a desirable weight pattern is obtained.

(In Addition to Variation 4-1)

The second evaluation criterion includes a criterion of a weighting pattern with which the number Q is a smallest value or a value close to the smallest value.

This evaluation criterion is used for judgment in addition to the evaluation criterion 4-1, and is a more desirable weight pattern since Q is small, which makes the above value of P/Q large.

<Modification>

In addition to the embodiment described as Embodiment 2, which can lessen the burden of selection of a plurality of keywords, identification of a weight pattern, and/or the like on the operator, designation of keywords and corresponding weights may be received from the operator as described in step S609 in FIG. 10.

Figure 21:
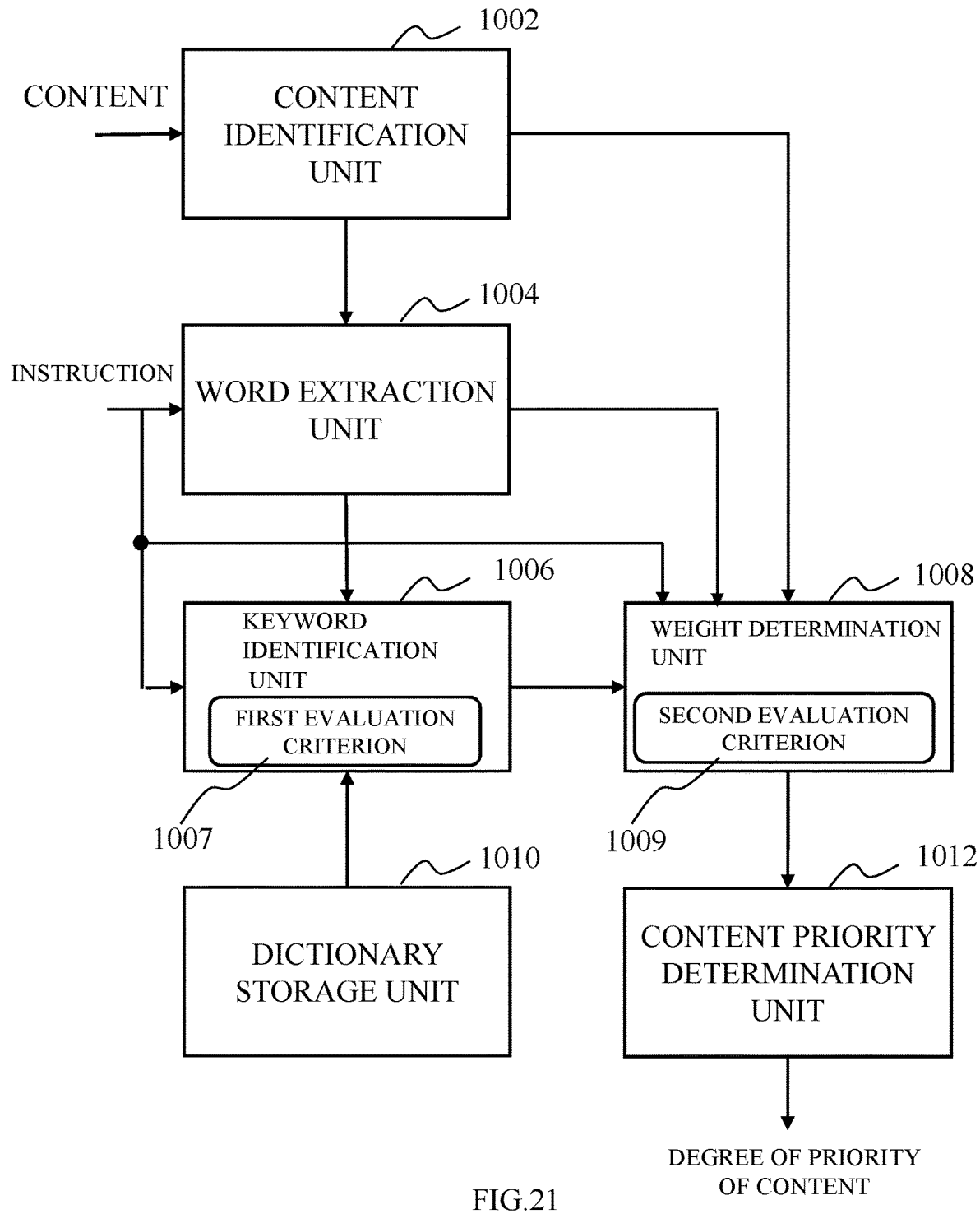
FIG. 21 is a block diagram illustrating functions in the embodiments.

FIG. 21 is a block diagram illustrating functions in the embodiments. This block diagram will be described below.

A content identification unit 1002 identifies various information on contents from search results, for example.

A word extraction unit 1004 is capable of receiving the positive set R1, the negative set G1, or the other set T1, extracting the words present in these sets, and presenting them to the operator, for example. The word extraction unit 1004 may extract words from all contents belonging to the set V or from some of the contents. Incidentally, there may be a case where the word extraction unit 1004 does not function. In this case, the operator may cause a keyword identification unit 1006 and a weight determination unit 1008 described next to function to identify keywords and their weights.

The keyword identification unit 1006 identifies keywords (positive keywords or negative keywords). The keywords may be selected by the operator from a presented word list. Alternatively, keywords designated by the operator themself may be used. The keyword identification unit 1006 may use a first evaluation criterion 1007 described above.

The weight determination unit 1008 is capable of determining weights for keywords based on an instruction (or a correction instruction) from the operator. The weight determination unit 1008 may use a second evaluation criterion 1009.

A dictionary storage unit 1010 is utilized to extract synonyms, quasi-synonyms, and/or variant notations of keywords as keywords.

A content priority determination unit 1012 calculates totals (degrees of priority) for contents as described above.

The calculated degrees of priority are utilized by the operator to efficiently process the contents.

Figure 22:
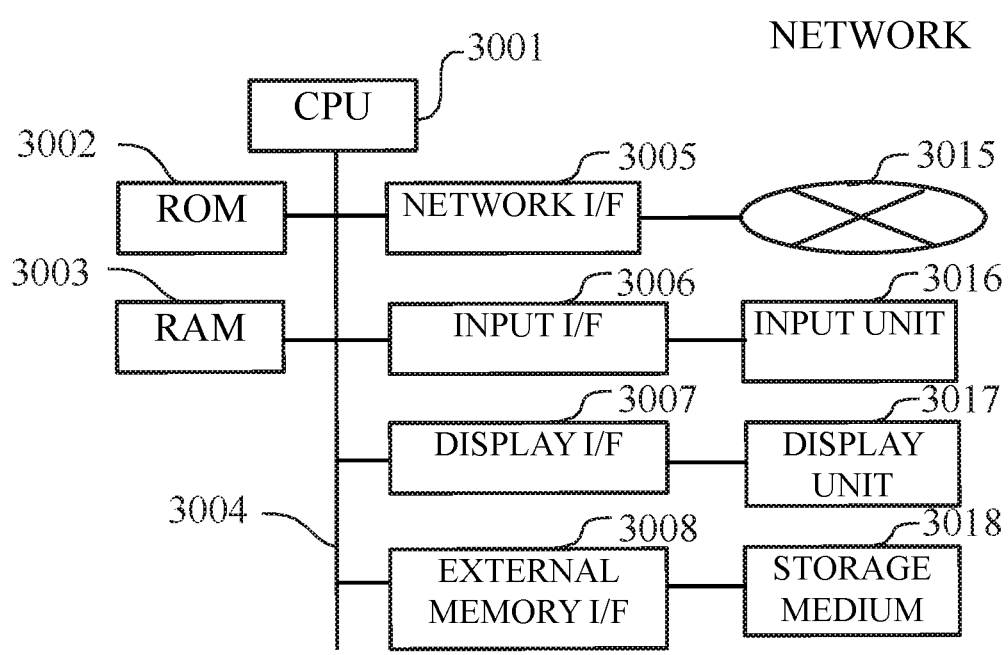
FIG. 22 is a diagram illustrating hardware components in the embodiments.

FIG. 22 is a diagram illustrating hardware components in the embodiments. The hardware components include a CPU 3001, a program in the present embodiments, a database and/or a ROM 3002 in which data can be stored, a RAM 3003, a network interface 3005, an input interface 3006, a display interface 3007, and an external memory interface 3008. These pieces of hardware are connected to one another by a bus 3004.

The network interface 3005 is connected to a network 3015. The network 3015 includes a wired LAN, a wireless LAN, the Internet, a telephone network, and the like. An input unit 3016 is connected to the input interface 3006. A display unit 3017 is connected to the display interface 3007. A storage medium 3018 is connected to the external memory interface 3008. The storage medium 3018 may be a RAM, a ROM, a CD-ROM, a DVD-ROM, a hard disk drive, a memory card, a USB memory, or the like.

The programs and methods to implement the above embodiments can be executed by a computer including the hardware components illustrated in FIG. 22.

The embodiments described above are not exclusive. It is possible to, for example, incorporate part of one embodiment in the other embodiment and replace part of one embodiment with part of the other embodiment.

In addition, the order of the flows in the exemplarily described flowcharts can be changed as long as there is no contradiction. Also, a single exemplarily described flow can be executed a plurality of times at different times as long as there is no contradiction. A plurality of steps may be executed simultaneously. Each step may be implemented by executing a program stored in a memory (non-transitory memory).

Also, some programs in the disclosed embodiments can be implemented by a versatile program, such as an operating system, or hardware. In addition, the disclosed programs may each be distributed among and executed by a plurality of pieces of hardware.

The programs that implement the above embodiments can be executed by a computer having the hardware components illustrated in FIG. 22. Also, the programs in the embodiments may be implemented as methods to be executed by a computer.

It is needless to say that the above embodiments do not limit the invention described in the claims but are to be construed as examples. Those skilled in the art may make modifications and alterations to the embodiments without departing from the scope and spirit of the invention. Accordingly, the foregoing detailed description is intended to be illustrative rather than restrictive. Also, text, speech, and the like that can be included in contents to be handled in the technique of the present disclosure and the invention described in the claims are not limited to a particular language, and may be expressed in any language or a mixture of a plurality of languages.

The invention claimed is:

1. A content processing method for determining a degree of priority of presentation of each of a plurality of contents, comprising:
   identifying the plurality of contents;
   receiving a first set including contents given positive evaluations from an operator and a second set including contents given negative evaluations from the operator from among the plurality of contents;
   extracting a first word set included in the first set and a second word set included in the second set;
   identifying a plurality of keywords including a plurality of positive keywords related to the first set and a plurality of negative keywords related to the second set according to a first evaluation criterion, the plurality of positive keywords being identified based on the first word set, the plurality of negative keywords being identified based on the second word set;
   giving weights to the plurality of keywords according to a second evaluation criterion so as to give a weight of zero or more to each of the plurality of positive keywords and give a weight of zero or less to each of the plurality of negative keywords;
   deriving a total for each of the plurality of contents by summing, over the plurality of keywords, a product of a frequency of appearance of each of the plurality of keywords and the given weight for the each of the plurality of keywords to obtain the total for each of the plurality of contents; and
   determining the degree of priority of presentation of each of the plurality of contents based on the total for the each of the plurality of contents.

2. The content processing method according to claim 1, wherein the first evaluation criterion includes a criterion of employing designation of a keyword from the operator.

3. The content processing method according to claim 1, wherein the first evaluation criterion includes a criterion of determining the plurality of keywords based on a frequency of appearance of each of words included in the first word set and the second word set per content in the first set and the second set.

4. The content processing method according to claim 3, wherein the first evaluation criterion includes a criterion of designating keywords whose frequencies of appearance in the first set are higher than frequencies of appearance thereof in the second set as the plurality of positive keywords, and designating keywords whose frequencies of appearance in the second set are higher than frequencies of appearance thereof in the first set as the plurality of negative keywords.

5. The content processing method according to claim 1, wherein
   the giving weights includes:
   preparing a finite number of candidate weights to give one of the finite number of candidate weights to each of the plurality of keywords;
   creating a plurality of weighting patterns in which one of the finite number of weights is given to each of the plurality of keywords by giving one of the finite number of weights to each of the plurality of keywords; and
   selecting one weighting pattern from among the plurality of weighting patterns according to the second evaluation criterion.

6. The content processing method according to claim 5, wherein the creating a plurality of weighting pattern includes:
   selecting $N_p$ weighting patterns from among $X_p$ weighting patterns in which one or ones of the finite number of weights are given to the plurality of positive keywords;
   selecting $N_n$ weighting patterns from among $X_n$ weighting patterns in which one or ones of the finite number of weights are given to the plurality of negative keywords; and
   creating $N_p \times N_n$ weighting patterns as the plurality of weighting patterns by comprehensively pairing the $N_p$ weighting patterns and the $N_n$ weighting patterns with one another.

7. The content processing method according to claim 6, wherein
   the selecting $N_p$ weighting patterns includes:
   by sequentially applying the $X_p$ weighting patterns, obtaining a total A for each of the plurality of contents included in the first set by summing, over the plurality of positive keywords, a product of a frequency of appearance of each of the plurality of positive keywords and the given weight for the each of the plurality of positive keywords, and summing the totals A for the plurality of contents included in the first set to obtain a sum SA, thereby obtaining $X_p$ sums SA corresponding respectively to the $X_p$ weighting patterns; and identifying $N_p$ sums SA from among the $X_p$ sums SA in descending order to select $N_p$ weighting patterns corresponding respectively to the identified $N_p$ sums SA, and/or the selecting $N_n$ weighting patterns includes:
by sequentially applying the $X_n$ weighting patterns, obtaining a total D for each of the plurality of contents included in the second set by summing, over the plurality of negative keywords, a product of a frequency of appearance of each of the plurality of negative keywords and the given weight for the each of the plurality of negative keywords, and summing the totals D for the plurality of contents included in the second set to obtain a sum SD, thereby obtaining $X_n$ sums SD corresponding respectively to the $X_n$ weighting patterns; and identifying $N_n$ sums SD from among the $X_n$ sums SD in ascending order to select $N_n$ weighting patterns corresponding respectively to the identified $N_n$ sums SD.

8. The content processing method according to claim 6, wherein the selecting $N_p$ weighting patterns includes:
by sequentially applying the $X_p$ weighting patterns, obtaining a total A for each of the plurality of contents included in the first set by summing, over the plurality of positive keywords, a product of a frequency of appearance of each of the plurality of positive keywords and the given weight for the each of the plurality of positive keywords, and obtaining a total $A_{pm}$ which is a smallest value among the totals A for the plurality of contents included in the first set, thereby obtaining $X_p$ totals $A_{pm}$ corresponding respectively to the $X_p$ weighting patterns; and identifying $N_p$ totals $A_{pm}$ from among the $X_p$ totals $A_{pm}$ in descending order to select $N_p$ weighting patterns corresponding respectively to the identified $N_p$ totals $A_{pm}$, and/or the selecting $N_n$ weighting patterns includes:
by sequentially applying the $X_n$ weighting patterns, obtaining a total $A_n$ for each of the plurality of contents included in the first set by summing, over the plurality of negative keywords, a product of a frequency of appearance of each of the plurality of negative keywords and the given weight for the each of the plurality of negative keywords, and obtaining a total $A_{nm}$ which is a smallest value among the totals $A_n$ for the plurality of contents included in the first set; and identifying $N_n$ totals $A_{nm}$ from among the $X_n$ totals $A_{nm}$ in descending order to select $N_n$ weighting patterns corresponding respectively to the identified $N_n$ totals $A_{nm}$.

9. The content processing method according to claim 6, wherein the selecting $N_p$ weighting patterns includes:
by sequentially applying the $X_p$ weighting patterns, obtaining a total $A_1$ for each of the plurality of contents included in the first set by summing, over the plurality of positive keywords, a product of a frequency of appearance of each of the plurality of positive keywords and the given weight for the each of the plurality of positive keywords, and summing the totals $A_1$ for the plurality of contents included in the first set to obtain a sum $SA_1$, thereby obtaining $X_p$ sums $SA_1$ corresponding respectively to the $X_p$ weighting patterns;

by sequentially applying the $X_p$ weighting patterns, obtaining a total $D_1$ for each of the plurality of contents included in the second set by summing, over the plurality of positive keywords, a product of a frequency of appearance of each of the plurality of positive keywords and the given weight for the each of the plurality of positive keywords, and summing the totals $D_1$ for the plurality of contents included in the second set to obtain a sum $SD_1$, thereby obtaining $X_p$ sums $SD_1$ corresponding respectively to the $X_p$ weighting patterns; and identifying $N_p$ calculation values $H_1$ ($=SA_1/SD_1$ or $SA_1-SD_1$) from among the calculation values $H_1$ corresponding respectively to the $X_p$ weighting patterns in descending order to select $N_p$ weighting patterns corresponding respectively to the $N_p$ calculation values $H_1$, and/or the selecting $N_n$ weighting patterns includes:
by sequentially applying the $X_n$ weighting patterns, obtaining a total $A_2$ for each of the plurality of contents included in the first set by summing, over the plurality of negative keywords, a product of a frequency of appearance of each of the plurality of negative keywords and the given weight for the each of the plurality of negative keywords, and summing the totals $A_2$ for the plurality of contents included in the first set to obtain a sum $SA_2$, thereby obtaining $X_n$ sums $SA_2$ corresponding respectively to the $X_n$ weighting patterns;

by sequentially applying the $X_n$ weighting patterns, obtaining a total $D_2$ for each of the plurality of contents included in the second set by summing, over the plurality of negative keywords, a product of a frequency of appearance of each of the plurality of negative keywords and the given weight for the each of the plurality of negative keywords, and summing the totals $D_2$ for the plurality of contents included in the second set to obtain a sum $SD_2$, thereby obtaining $X_n$ sums $SD_2$ corresponding respectively to the $X_n$ weighting patterns; and identifying $N_n$ calculation values $H_2$ ($=SA_2/SD_2$ or $SD_2-SA_2$) from among the calculation values $H_2$ corresponding respectively to the $X_n$ weighting patterns in ascending order to select $N_n$ weighting patterns corresponding respectively to the $N_n$ calculation values $H_2$.

10. The content processing method according to claim 1, wherein the giving weights includes solving an optimization problem that derives the weight for each of the plurality of keywords with the second evaluation criterion as an objective function to thereby determine a weighting pattern specifying weighting to be applied to each of the plurality of keywords.

11. The content processing method according to claim 1, wherein the second evaluation criterion includes a criterion of a weighting pattern with which a sum $SA_3$ obtained by summing totals $A_3$ for the plurality of contents included in the first set is a largest value or a value close to the largest value, the totals $A_3$ each being obtained for one of the plurality of contents included in the first set by summing, over the plurality of keywords, a product of a frequency of appearance of each of the plurality of keywords and a possible value of the corresponding weight.

12. The content processing method according to claim 1, wherein the second evaluation criterion includes a criterion of a weighting pattern with which a total $A_3m$ being a smallest value among totals $A_3$ is a largest value or a value close to the largest value, the totals $A_3$ each being obtained for one of the plurality of contents included in the first set by summing, over the plurality of keywords, a product of a frequency of appearance of each of the plurality of keywords and a possible value of the corresponding weight.

13. The content processing method according to claim 1, wherein the second evaluation criterion includes a criterion of a weighting pattern with which, when totals $A_4$ for the plurality of contents included in the first set and the second set are arranged in descending order, a position of the lowest total $A_4$ among the totals $A_4$ for the plurality of contents included in the first set is a highest position or a position close to the highest position, the totals $A_4$ each being obtained for one of the plurality of contents included in the first set and the second set by summing, over the plurality of keywords, a product of a frequency of appearance of each of the plurality of keywords and a possible value of the corresponding weight.

14. The content processing method according to claim 1, wherein the second evaluation criterion includes a criterion of a weighting pattern with which a value of P/Q calculated by using a position P and a number Q is a largest value or a value larger than a predetermined value, where when totals $A_4$ for the plurality of contents included in the first set and the second set are arranged in descending order, the position P is a position of the lowest total $A_4$ among the totals $A_4$ for the plurality of contents included in the first set, the totals $A_4$ each being obtained for one of the plurality of contents included in the first set and the second set by summing, over the plurality of keywords, a product of a frequency of appearance of each of the plurality of keywords and a possible value of the corresponding weight, and the number Q is such a number of the plurality of contents included in the first set and the second set that a sum $SA_4$ obtained by summing the totals $A_4$ for the plurality of contents included in the first set is larger than a predetermined threshold.

15. The content processing method according to claim 14, wherein the second evaluation criterion further includes a criterion of a weighting pattern with which the number Q is a smallest value or a value close to the smallest value.

16. A non-transitory computer-readable medium storing a program that causes a computer to execute the method according to claim 1.

* * * * *